United States Patent
Masugi

(10) Patent No.: US 8,456,750 B2
(45) Date of Patent: Jun. 4, 2013

(54) ZOOM LENS, OPTICAL APPARATUS AND ZOOM LENS MANUFACTURING METHOD

(75) Inventor: Saburo Masugi, Kawasaki (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/215,375

(22) Filed: Aug. 23, 2011

(65) Prior Publication Data

US 2012/0050886 A1    Mar. 1, 2012

(30) Foreign Application Priority Data

Aug. 31, 2010    (JP) ................... 2010-194998

(51) Int. Cl.
*G02B 15/14* (2006.01)

(52) U.S. Cl.
USPC .......................................... 359/689

(58) Field of Classification Search
USPC .......................... 359/680–682, 689
See application file for complete search history.

(56) References Cited

U.S. PATENT DOCUMENTS

| | | | | |
|---|---|---|---|---|
| 7,830,616 B2* | 11/2010 | Masugi | .......................... | 359/689 |
| 2003/0123156 A1* | 7/2003 | Minefuji | ...................... | 359/682 |
| 2005/0200970 A1 | 9/2005 | Nose et al. | | |
| 2005/0207023 A1* | 9/2005 | Suzuki | .......................... | 359/680 |
| 2008/0158690 A1 | 7/2008 | Eguchi | | |
| 2010/0254023 A1* | 10/2010 | Ito | .............................. | 359/682 |

FOREIGN PATENT DOCUMENTS

| | | |
|---|---|---|
| JP | 2005-084648 A | 3/2005 |
| JP | 2005-258067 A | 9/2005 |
| JP | 2006-201492 A | 8/2006 |
| JP | 2008-181118 A | 8/2008 |

* cited by examiner

Primary Examiner — Scott J Sugarman
(74) Attorney, Agent, or Firm — Miles & Stockbridge P.C.

(57) ABSTRACT

A zoom lens includes, in order from an object, a first lens group G1 having negative refractive power; a second lens group G2 having positive refractive power; and a third lens group G3 having positive refractive power. The first lens group G1 comprises only one negative spherical lens (lens L11) and one plastic positive lens (lens L12) separated by an air gap. The second lens group G2 comprises three or fewer lenses, including a positive lens component (cemented lens comprising a lens L21 and a lens L22), and one plastic negative lens (lens L23). The following conditional expressions are satisfied: $0.50 < f1PL/(-f2PL) < 2.50$ and $0.80 < (-f1)/f2 < 1.35$, where f1PL is a focal length of the plastic positive lens forming the first lens group G1, f2PL is the focal length of the plastic negative lens forming the second lens group G2, f1 is the focal length of the first lens group G1, and f2 is the focal length of the second lens group G2.

18 Claims, 18 Drawing Sheets

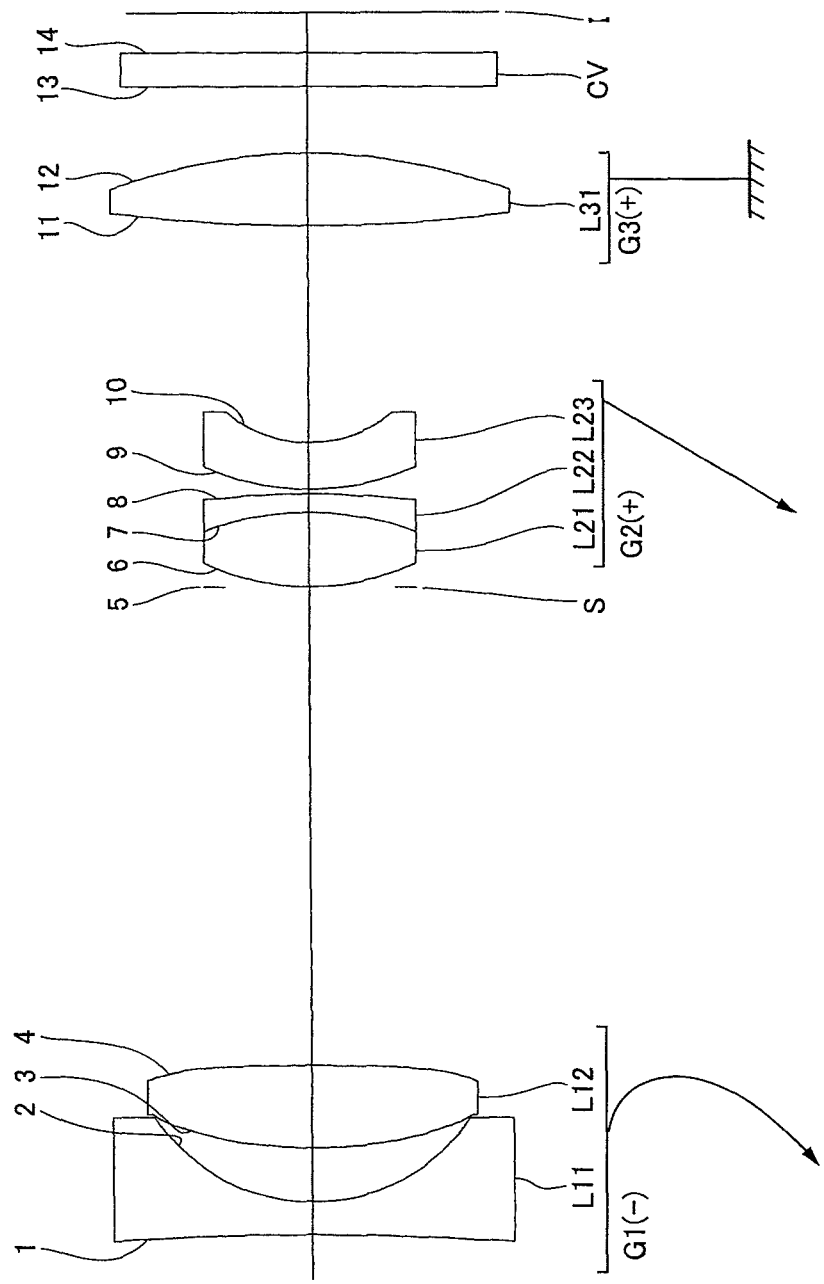

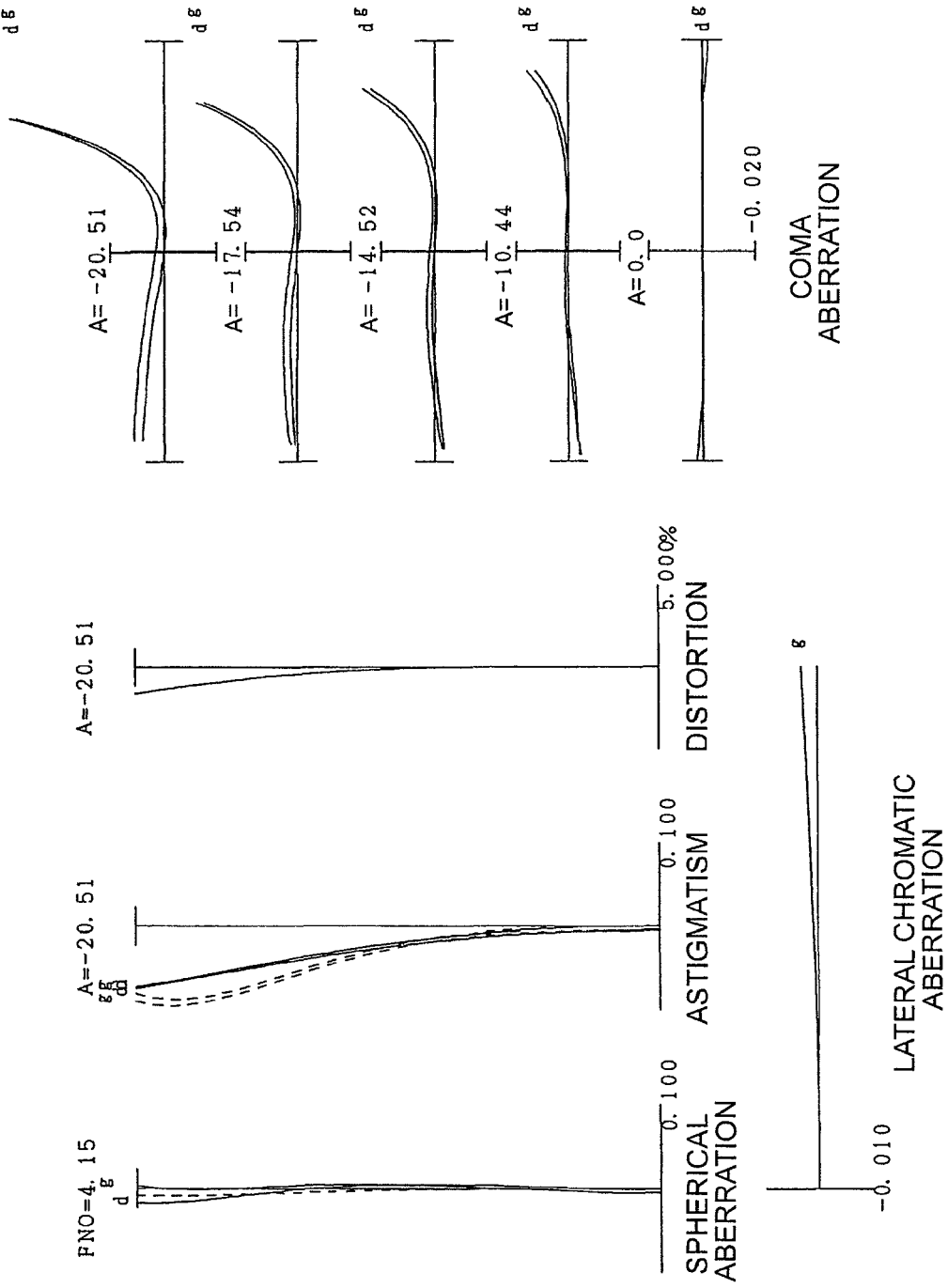

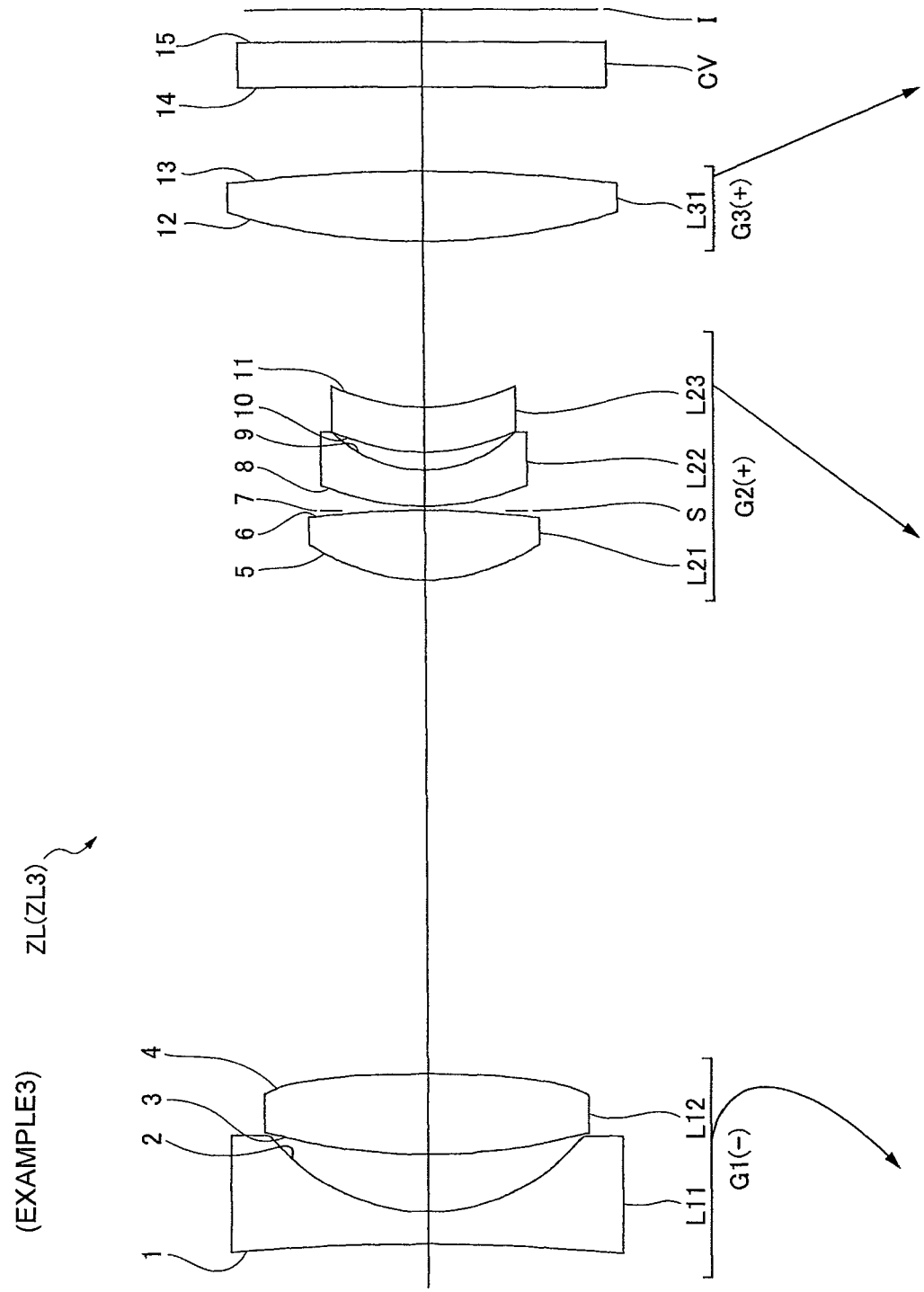

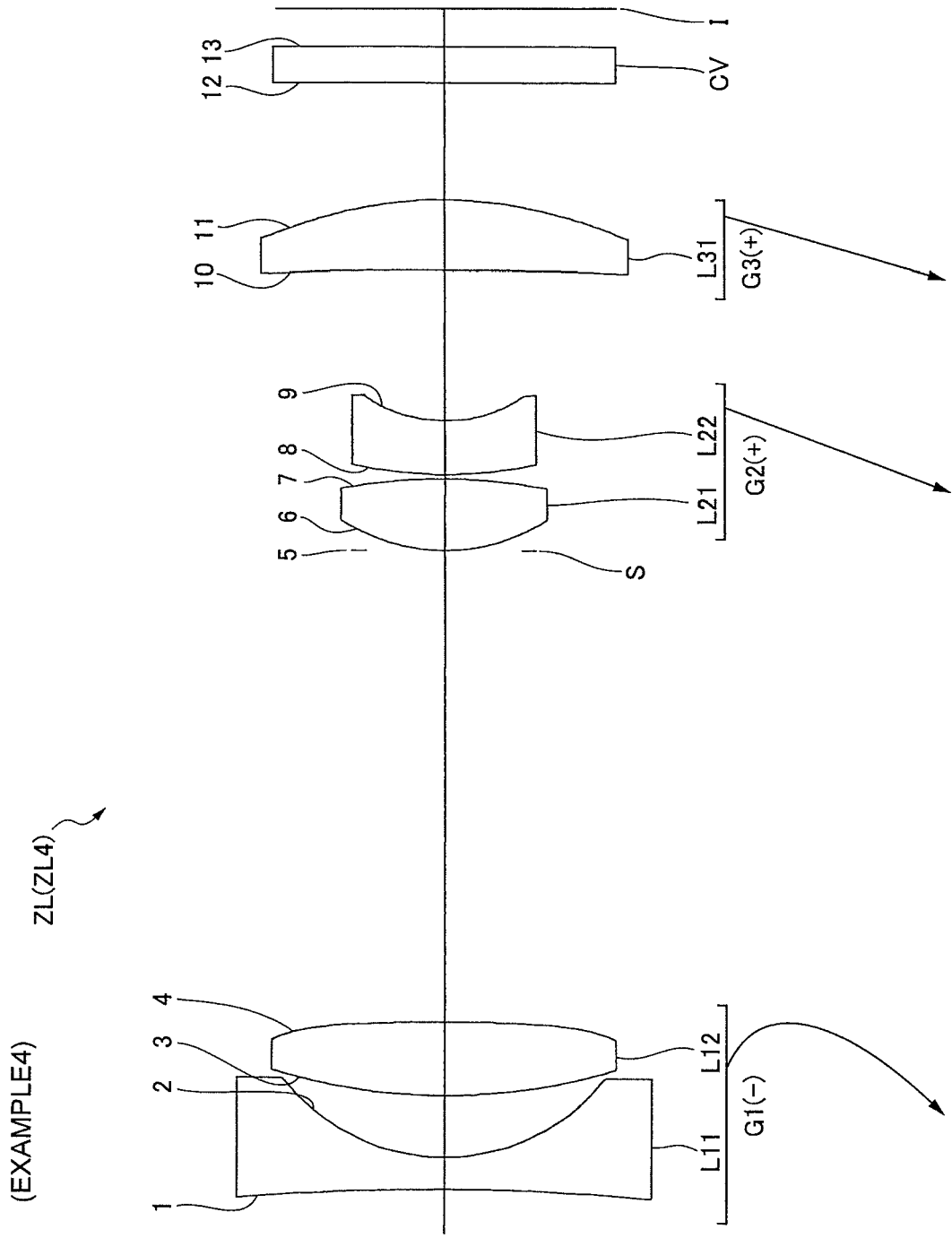

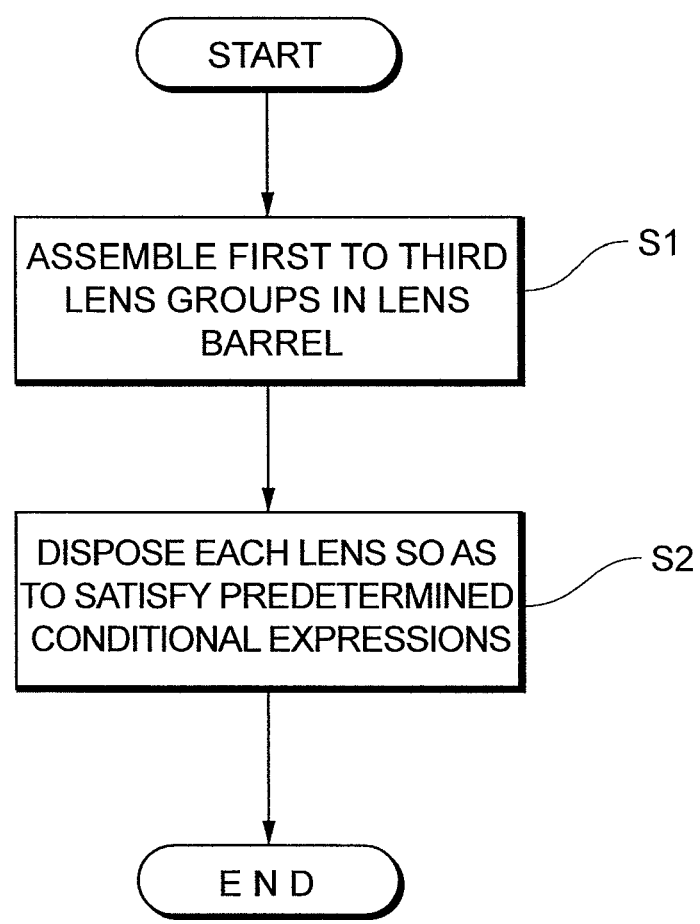

ZOOM LENS, OPTICAL APPARATUS AND ZOOM LENS MANUFACTURING METHOD

RELATED APPLICATIONS

This invention claims the benefit of Japanese Patent Application No. 2010-194998 which is hereby incorporated by reference.

TECHNICAL FIELD

The present invention relates to a zoom lens, an optical apparatus and a zoom lens manufacturing method.

TECHNICAL BACKGROUND

The popularization of digital still cameras in recent years has fostered expectations of ever cheaper cameras. There is thus a demand for reduction in the cost of imaging optical systems that are built into the cameras. The portability of digital still cameras is also a major issue. The size and weight of zoom lenses, as image-capturing lenses, have to be reduced in order to achieve smaller, thinner and lighter camera bodies.

To meet these demands, a zoom lens has been developed that comprises, in order from an object, a first lens group having negative refractive power, a second lens group having positive refractive power, and a third lens group having positive refractive power, wherein the first lens group comprises only two lenses by effectively arranging an aspherical lens as a negative lens in the first lens group (for instance, Japanese Laid-open Patent Publication No. 2005-84648(A)).

SUMMARY OF THE INVENTION

However, using an aspherical lens as a negative lens, as in conventional zoom lenses, entails a significant increase in manufacturing costs.

In the light of the above problem, it is an object of the present invention to provide a high-quality zoom lens that, though inexpensive, is small and boasts a high zoom ratio, and to provide an optical apparatus and a zoom lens manufacturing method.

In order to attain the above object, the present invention comprises, in order from an object, a first lens group having negative refractive power; a second lens group having positive refractive power; and a third lens group having positive refractive power, wherein the first lens group comprises only one negative spherical lens and one plastic positive lens separated by an air gap; the second lens group comprises three or fewer lenses, including one positive lens component and one plastic negative lens; and the condition of the following expressions are satisfied: $0.50<f1PL/(-f2PL)<2.50$ and $0.80<(-f1)/f2<1.35$, where f1PL is a focal length of the plastic positive lens forming the first lens group, f2PL is the focal length of the plastic negative lens forming the second lens group, f1 is the focal length of the first lens group, and f2 is the focal length of the second lens group.

In the zoom lens according to the present invention, preferably, there is satisfied the condition of the following expression $1.00<f1PL/(-f1)<3.00$.

In the zoom lens according to the present invention, preferably, there is satisfied the condition of the following expression $15.0<vd2<35.0$, where vd2 is the Abbe number of the plastic negative lens forming the second lens group.

In the zoom lens according to the present invention, preferably, the positive lens component forming the second lens group satisfies the condition of the following expression $0.30<(R22+R21)/(R22-R21)<1.20$, where R21 is the radius of curvature of a lens surface facing the object, and R22 is the radius of curvature of a lens surface facing the image.

In the zoom lens according to the present invention, preferably, the plastic negative lens forming the second lens group is a spherical lens.

In the zoom lens according to the present invention, preferably, the negative spherical lens forming the first lens group satisfies the following expression $0.65<-(R12+R11)/(R12-R11)<1.50$, where R11 is the radius of curvature of a lens surface facing the object and R12 is the radius of curvature of a lens surface facing the image.

In the zoom lens according to the present invention, preferably, there is satisfied the condition of the following expression $15.0<vd1<35.0$, where vd1 is the Abbe number of the plastic positive lens forming the first lens group.

In the zoom lens of according to the present embodiment, preferably, the third lens group comprises one lens.

In the zoom lens according to the present invention, preferably, the third lens group comprises a plastic lens.

In the zoom lens according to the present invention, preferably, an aperture stop is arranged farther on the image side than the first lens group.

In the zoom lens according to the present invention, preferably, the aperture stop moves together with the second lens group, upon zooming from a wide-angle end state to a telephoto end state.

An optical apparatus of the present invention (for instance, the digital still camera 1 of the present embodiment) comprises any of the above-described zoom lenses.

The zoom lens manufacturing method of the present invention is configured so as to manufacture the above-described zoom lenses.

In the zoom lens manufacturing method of the present invention, preferably, there is satisfied the condition of the following expression $1.00<f1PL/(-f1)<3.00$.

In the zoom lens manufacturing method of the present invention, preferably, there is satisfied the condition of the following expression $15.0<vd2<35.0$, where vd2 is the Abbe number of the plastic negative lens forming the second lens group.

In the zoom lens manufacturing method of the present invention, preferably, the positive lens component forming the second lens group satisfies the condition of the following expression $0.30<(R22+R21)/(R22-R21)<1.20$, where R21 is the radius of curvature of a lens surface facing the object, and R22 is the radius of curvature of a lens surface facing the image.

In the zoom lens manufacturing method of the present invention, preferably, the plastic negative lens forming the second lens group is a spherical lens.

In the zoom lens manufacturing method of the present invention, preferably, the negative spherical lens forming the first lens group satisfies the following expression $0.65<-(R12+R11)/(R12-R11)<1.50$, where R11 is the radius of curvature of a lens surface facing the object and R12 is the radius of curvature of a lens surface facing the image.

The present invention succeeds in providing a high-quality zoom lens that, though inexpensive, is compact and boasts a high zoom ratio, and is appropriate, in particular, for video cameras, electronic still cameras and the like that use solid imaging elements; and succeeds in providing an optical apparatus and a zoom lens manufacturing method.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention.

FIG. 1 is a diagram illustrating a lens schematic diagram and zoom locus in Example 1;

FIG. 2 is a set of aberration graphs of a zoom lens according to Example 1, wherein

FIG. 4 is a set of aberration graphs of a zoom lens according to Example 2, wherein FIG. 4B is a set of aberration graphs with focus at infinity in an intermediate focal length state.

FIG. 5 is a diagram illustrating a lens schematic diagram and zoom locus in Example 3;

FIG. 6 is a set of aberration graphs of a zoom lens according, to Example 3, wherein

FIG. 7 is a diagram illustrating a lens schematic diagram and zoom locus in Example 4;

FIG. 8 is a set of aberration graphs of a zoom lens according to Example 4, wherein

FIG. 10 is a flowchart for explaining a method for manufacturing a zoom lens according to the present embodiment.

DESCRIPTION OF THE EMBODIMENTS

Figure 2A:
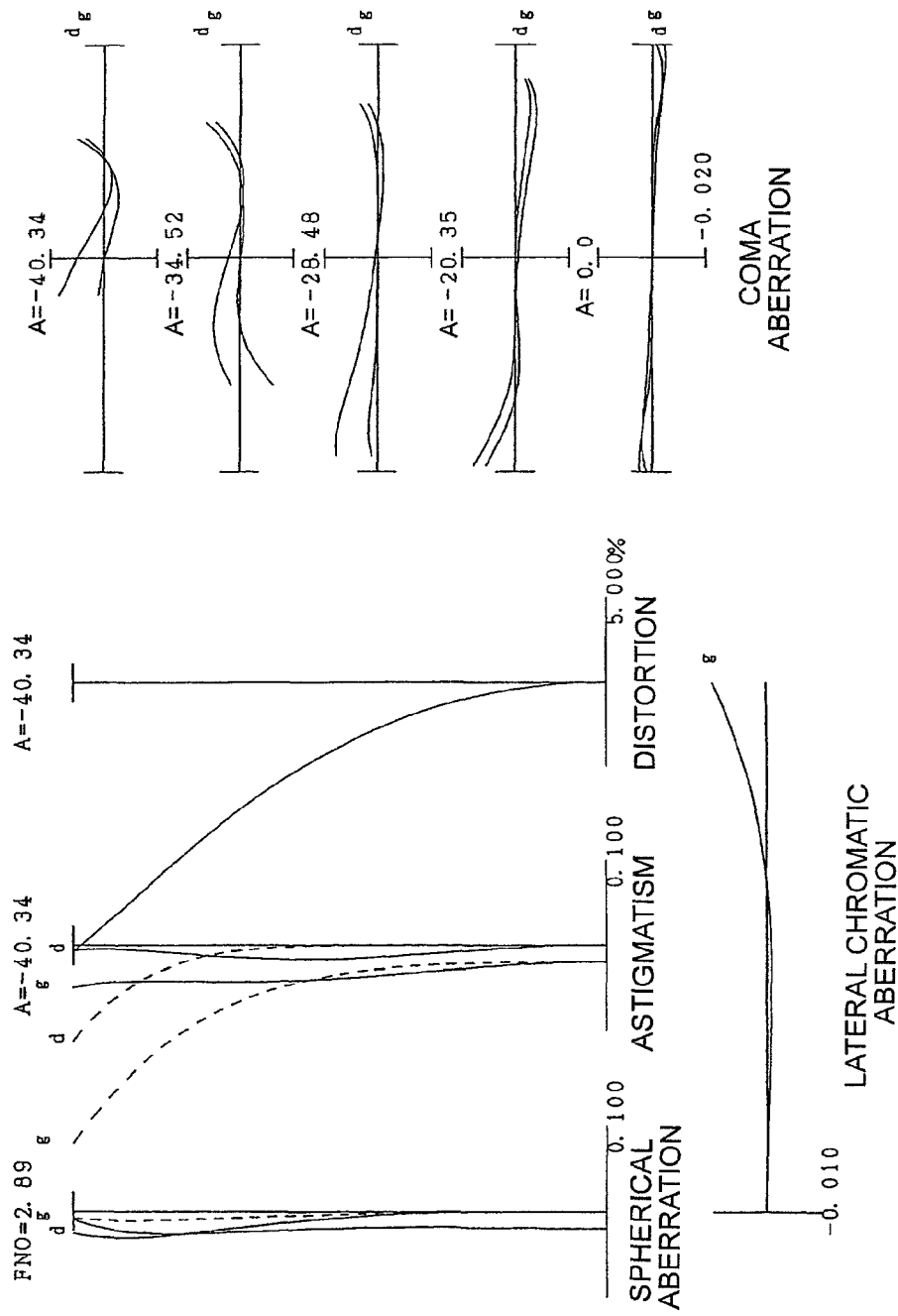
FIG. 2A is a set of aberration graphs with focus at infinity in a wide-angle end state.

The present embodiment will be explained next. The zoom lens according to the present embodiment comprises, disposed in order from an object, a first lens group having negative refractive power; a second lens group having positive refractive power; and a third lens group having positive refractive power; wherein a half angle of view in a wide-angle end state exceeds 35°; the first lens group comprises only one negative spherical lens (spherical surfaces encompass planar surfaces) and one plastic positive lens; the second lens group comprises three or fewer lenses, including one positive lens component (where the positive lens component includes a positive single lens and a positive cemented lens) and one plastic negative lens; and conditional expressions (1) and (2) below are satisfied, in which f1PL is a focal length of the plastic positive lens forming the first lens group, f2PL is the focal length of the plastic negative lens forming the second lens group, f1 is the focal length of the first lens group, and f2 is the focal length of the second lens group.

$$0.50 < f1PL/(-f2PL) < 2.50 \quad (1)$$

$$0.80 < (-f1)/f2 < 1.35 \quad (2)$$

A high-zoom ratio optical system can be configured thus through the presence of a plurality of lens groups. Also, costs can be lowered by using a plastic lens at least in the first lens group and the second lens group. Focal length and/or aberration fluctuations upon changes in temperature are substantial when a plastic lens is used only in the first lens group. The magnitude of these fluctuations becomes less negligible the higher the zoom ratio of the optical system is. However, focal length and/or aberration fluctuations upon changes in temperature can be mitigated, and higher optical performance achieved, by arranging plastic lenses across a plurality of lens groups, as in the zoom lens of the present embodiment.

Configuring the first lens group out of a total of two lenses, i.e. one negative spherical lens and one plastic positive lens separated by an air gap, has the effect of reducing the size of the optical system and involves a small number of constituent lens surfaces. Flares and ghosts are few as a result, which in turn translates into good optical performance. Also, using a negative lens having a spherical surface in the first lens group (and not using a negative lens of aspherical surface) contributes significantly to curbing manufacturing costs. Further, configuring the second lens group out of three or fewer lenses including one positive lens component and one plastic negative lens has the effect of limiting the number of constituent lenses, and enables size reduction while suppressing flares and ghosts, all of which allows preserving a good optical performance.

Conditional expression (1) defines the ratio between the focal length of the plastic positive lens forming the first lens group and the focal length of the plastic negative lens forming the second lens group. Focal length and/or astigmatism fluctuations upon changes in temperature become substantial outside the range of conditional expression (1). When conditional expression (1) is satisfied, by contrast, a zoom ratio of 4× or higher can be realized in the optical system, while preserving good performance during temperature changes and keeping manufacturing costs down.

To secure the effect of the present embodiment, preferably, the upper limit value in conditional expression (1) is set to 2.00. To secure the effect of the present embodiment, preferably, the lower limit value in conditional expression (1) is set to 0.70.

Conditional expression (2) above defines the ratio between the focal length of the first lens group and the focal length of the second lens group. Values outside the range of conditional expression (2) result in significantly worse coma aberration and astigmatism, and the displacements of the various lens groups become larger, all of which is undesirable in terms of size reduction. If conditional expression (2) is satisfied, by contrast, the zoom ratio can be easily raised to 4× or higher, and a wider angle achieved, without much of an increase in the overall size of the zoom lens.

To secure the effect of the present embodiment, preferably, the upper limit value in conditional expression (2) is set to 1.25. To secure the effect of the present embodiment, preferably, the lower limit value in conditional expression (2) is set to 0.95.

Preferably, the zoom lens according to the present embodiment satisfies conditional expression (3) below.

$$1.00 < f1PL/(-f1) < 3.00 \quad (3)$$

Conditional expression (3) defines the ratio between the focal length of the plastic positive lens forming the first lens group and the focal length of the first lens group. Chromatic aberration worsens when the upper limit value of conditional expression (3) is exceeded, while correction of coma aberration becomes difficult below the lower limit value of conditional expression (3).

To secure the effect of the present embodiment, preferably, the upper limit value in conditional expression (3) is set to 2.00. To secure the effect of the present embodiment, preferably, the lower limit value in conditional expression (3) is set to 1.20.

Preferably, the zoom lens of the present embodiment satisfies conditional expression (4) below, where vd2 is the Abbe number of the plastic negative lens forming the second lens group.

$$15.0<vd2<35.0 \quad (4)$$

Conditional expression (4) prescribes the Abbe number of a plastic negative lens forming the second lens group. Correction of lateral chromatic aberration is difficult outside the range of conditional expression (4).

To secure the effect of the present embodiment, preferably, the upper limit value in conditional expression (4) is set to 30.0. To secure the effect of the present embodiment, preferably, the lower limit value in conditional expression (4) is set to 20.0.

Preferably, the positive lens component forming the second lens group of the zoom lens according to the present embodiment satisfies conditional expression (5) below, where R21 is the radius of curvature of a lens surface facing the object, and R22 is the radius of curvature of a lens surface facing the Image.

$$0.30<(R22+R21)/(R22-R21)<1.20 \quad (5)$$

Conditional expression (5) prescribes a shape factor assuming one lens as the positive lens component forming the second lens group. Correction of coma aberration is difficult outside the range of conditional expression (5).

To secure the effect of the present embodiment, preferably, the upper limit value in conditional expression (5) is set to 1.00. To secure the effect of the present embodiment, preferably, the lower limit value in conditional expression (5) is set to 0.40.

In the zoom lens of the present embodiment, preferably, the plastic negative lens forming the second lens group is a spherical lens (herein a spherical surface includes a planar surface). Spherical and planar lens surfaces are preferable in that processing of the lenses and adjustment of the lens assembly is easy, in terms of preventing impairment of optical performance due to processing and/or assembly errors. Spherical and planar lens surfaces are also preferable in that depictive performance is less impaired even upon shifting of the image plane.

In the zoom lens according to the present embodiment, preferably, the negative spherical lens forming the first lens group satisfies conditional expression (6), where R11 is the radius of curvature of a lens surface facing the object and R12 is the radius of curvature of a lens surface facing the image.

$$0.65<-(R12+R11)/(R12-R11)<1.50 \quad (6)$$

Conditional expression (6) defines the shape factor of the negative spherical lens forming the first lens group.

Correction of coma aberration is difficult outside the range of conditional expression (6).

To secure the effect of the present embodiment, preferably, the upper limit value in conditional expression (6) is set to 1.30. To secure the effect of the present embodiment, preferably, the lower limit value in conditional expression (6) is set to 0.80.

Preferably, the zoom lens of the present embodiment satisfies conditional expression (7) below, where vd1 is the Abbe number of the plastic positive lens forming the first lens group.

$$15.0<vd1<35.0 \quad (7)$$

Conditional expression (7) prescribes the Abbe number of the plastic positive lens forming the first lens group. Correction of coma aberration and chromatic aberration is difficult outside the range of conditional expression (7).

To secure the effect of the present embodiment, preferably, the upper limit value in conditional expression (7) is set to 30.0. To secure the effect of the present embodiment, preferably, the lower limit value in conditional expression (7) is set to 20.0.

In the zoom lens of according to the present embodiment, preferably, the third lens group comprises one lens. Decreasing thus the number of constituent lenses enables reductions in size and suppressing the occurrence of flares and ghosts.

In the zoom lens of according to the present embodiment, preferably, the third lens group comprises a plastic lens. The third lens group is a lens group near the imaging plane. Therefore, performance changes during temperature changes are virtually negligible, even if the third lens group comprises a plastic lens. From the viewpoint of manufacturing costs, therefore, a plastic lens is preferably used in the third lens group.

In the zoom lens according to the present embodiment, preferably, an aperture stop is arranged farther on the image side than the first lens group. This configuration allows satisfactorily correcting fluctuation of aberrations such as coma aberration caused by zooming.

In the zoom lens according to the present embodiment, preferably, the aperture stop shifts together with the second lens group upon zooming from a wide-angle end state to a telephoto end state. This configuration allows satisfactorily correcting fluctuation of aberrations such as coma aberration caused by zooming.

Figure 9A:
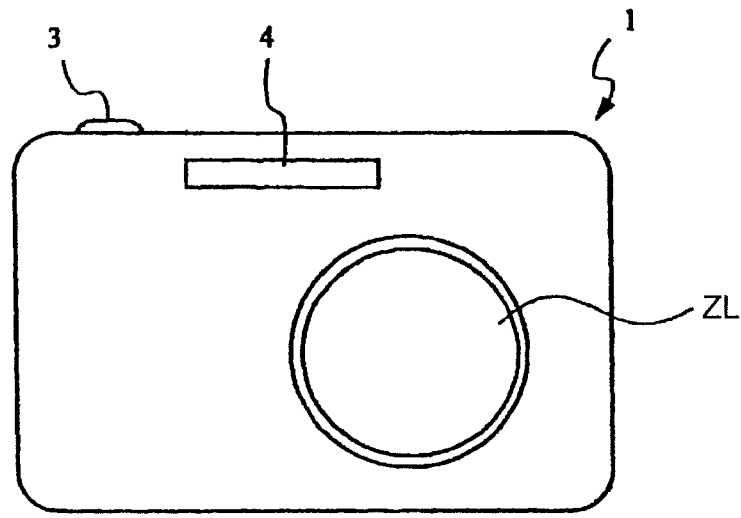
FIG. 9A is a front-view diagram of a digital still camera.
Figure 9B:
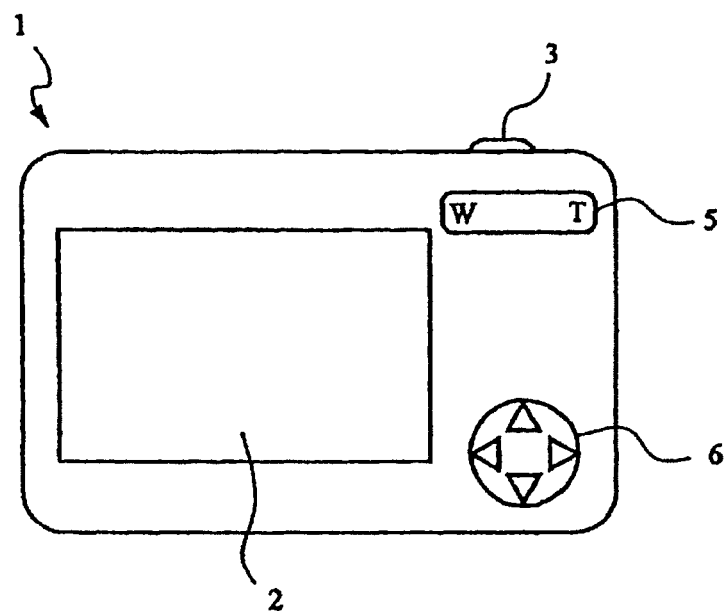
FIG. 9B is a rear-view diagram of the digital still camera.

FIG. 9 illustrates a digital still camera 1 (optical apparatus) provided with the above-described zoom lens as an image-capturing lens ZL. In the digital still camera 1, a shutter, not shown, of the image-capturing lens ZL is opened when a power button, not shown, is depressed. Thereupon, light from a subject (object) is condensed by the image-capturing lens ZL, and is focused to form an image on an imaging element (comprising, for instance, a CCD, CMOS or the like) arranged at an image surface I (FIG. 1). The subject image formed on the imaging element is displayed on a liquid crystal monitor 2 that is arranged on the rear of the digital still camera 1. The photographer decides the composition of the subject image while looking at the liquid crystal monitor 2, and depresses then a release button 3 to capture the subject image at the imaging element. The subject Image is recorded and stored in a memory not shown.

The camera 1 is provided with, for instance, an auxiliary light emitter 4 to emit auxiliary light in the case of a dark subject, a wide (W)-tele (T) button 5 for zooming of the image-capturing lens ZL from a wide-angle end state (W) to a telephoto end state (T), and a function button 6 used for setting various conditions of the digital still camera 1.

A manufacturing method of the zoom lens having the above-described configuration will be explained next with reference to FIG. 10. Firstly, the first to third lens groups (for instance, first to third lens groups G1 to G3 of FIG. 1) are assembled in a lens barrel (step S1). In this assembly step, the various lenses are disposed so that the first lens group has negative refractive power, the second lens group has positive refractive power and the third lens group has positive refractive power. The first lens group comprises only one negative spherical lens and one plastic positive lens separated by an air gap. The second lens group is assembled so that there are three or fewer constituent lenses including one positive lens component and one plastic negative lens. Next, the various lenses are disposed so as to satisfy 0.50<f1PL/(−f2PL)<2.50 (conditional expression (1) above) and 0.80<(−f1)/f2<1.35 (conditional expression (2) above), in which f1PL is a focal length of the plastic positive lens forming the first lens group, f2PL is the focal length of the plastic negative lens forming the second lens group, f1 is the focal length of the first lens group, and f2 is the focal length of the second lens group (step S2). To assemble the lenses in the lens barrel, the lenses may assembled sequentially one by one in the lens along the optical axis, or some or all the lenses may be held integrally with a holding member, and be then assembled with a lens barrel member. After assembly of the various lens groups in the lens barrel, it is checked whether an object image is formed in a state where the lens groups are assembled within the lens barrel, i.e. whether the centers of the lenses are aligned, followed by a check of the various operations of the zoom lens. Examples of the various operations include, for instance, a zoom operation of zooming from the wide-angle end state to the telephoto end state (wherein, for instance, the first lens group G1 and the second lens group G2 in FIG. 1 move, the third lens group G3 remains fixed throughout, and the aperture stop S moves together with the second lens group G2), and a focusing operation in which lenses that perform focusing from an object at a long distance to an object at a short distance (for instance, third lens group G3 of FIG. 1) move along the optical axis direction. The checking sequence of the various operations is arbitrary. Such a manufacturing method allows obtaining a high-quality zoom lens that, though inexpensive, is small and boasts a high zoom ratio.

EXAMPLES

Examples of the present invention are explained below with reference to accompanying drawings. Tables 1 to 4 summarize various parameters in Example 1 to Example 4. In "general data", f is the focal length of the entire system, Fno is the F number, and ω is the half angle of view. In "lens data", the surface number indicates the order of the lens surface from the object, along the direction of travel of light rays, r is the radius of curvature of each lens surface, d denotes the distance to the next surface, being a distance from each optical surface to a next optical surface (or image surface), along the optical axis, nd denotes the refractive index for the d-line (wavelength 587.6 nm) and vd is the Abbe number for the d-line. The surface number is marked with an asterisk (*) if the lens surface is an aspherical surface. The column of the radius of curvature r denotes a paraxial radius of curvature. A radius of curvature "0.0000" indicates a planar surface or an aperture. The refractive index of air "1.00000" is omitted.

In the "aspherical surface data", the shape of aspherical surfaces given in "lens data" is expressed by conditional expression (a) below. Specifically, when y is a height in a direction perpendicular to the optical axis, S(y) is a distance (sag) along the optical axis, from a tangent plane at a vertex of the aspherical surface up to the position of the aspherical surface at height y, r is a radius of curvature of a reference spherical surface (paraxial radius of curvature), κ is the conic constant, and An is the n-th order aspherical coefficient, the following expression (a) is established. In the examples below, E−n denotes ×10$^{-n}$. For instance, 1.234E−05=1.234×10$^{-5}$.

$$S(y)=(y^2/r)/\{1+(1-\kappa \cdot y^2/r^2)^{1/2}\}+A4 \times y^4+A6 \times y^6+A8 \times y^8+A10 \times y^{10} \quad (a)$$

The "variable spacing data" di (wherein i is an integer) denotes a variable spacing between an i-th surface and an (i+1)-th surface, at the wide-angle end state, the intermediate focal length state and the telephoto end state. In "Focal lengths of the respective lens groups" there are listed the initial surface and the focal length of each group. In "conditional expression" there are set forth the values corresponding to conditional expressions (1) to (7) above.

In the tables, the units used for the focal length f, the radius of curvature r and the distance to the next surface d, as well as other lengths, are ordinarily "mm". The units, however, are not limited to "mm", and other suitable units may be used, since the same optical performance is obtained when the optical system is expanded or shrunk proportionally.

The above explanation applies also to the tables in the other examples.

Example 1

Example 1 will be explained based on FIG. 1, FIG. 2 and Table 1. FIG. 1 illustrates a lens schematic diagram and zoom locus in Example 1. As illustrated in FIG. 1, a zoom lens ZL (ZL1) according to Example 1 has, disposed in order from an object, a first lens group G1 having negative refractive power; a second lens group G2 having positive refractive power; and a third lens group G3 having positive refractive power.

The first lens group G1 comprises, disposed in order from an object, a biconcave spherical lens L11 and a biconvex plastic positive lens L12.

The second lens group G2 comprises, disposed in order from an object, a cemented lens of a biconvex positive lens L21 and a negative meniscus lens L22 having a concave surface facing the object, and a plastic negative lens L23 having a negative meniscus shape with a convex surface facing the object.

The third lens group G3 comprises a biconvex plastic positive lens L31.

An aperture stop S for regulating the amount of light is arranged between the first lens group G1 and the second lens group G2. Between the third lens group G3 and the image surface I there is arranged a sensor cover glass CV of a solid imaging element, such as a CCD or the like, that is disposed on the image surface I.

Upon zooming from the wide-angle end state to the telephoto end state in the present example, the first lens group G1 and the second lens group G2 move while the third lens group G3 remains fixed. The aperture stop S moves together with the second lens group G2.

Various data on Example 1 are given in Table 1 below. The surface numbers 1 to 14 in Table 1 correspond to the surfaces 1 to 14 illustrated in FIG. 1. In Example 1, the third surface, fourth surface, sixth surface and twelfth surface have aspherical surface shapes.

TABLE 1

[General data]

|  | Wide-angle end | Intermediate | Telephoto end |
|---|---|---|---|
| f | 4.066 | 8.138 | 16.287 |
| Fno | 2.89 | 4.11 | 6.58 |
| ω | 40.34 | 22.19 | 11.28 |
| Image height | 2.900 | 3.250 | 3.250 |

[Lens data]

| Surface number | r | d | nd | vd | |
|---|---|---|---|---|---|
| 1 | −64.7052 | 0.70 | 1.75500 | 52.3 | |
| 2 | 4.0284 | 1.15 | | | |
| 3 | 10.1654 | 1.75 | 1.60740 | 27.0 | (OKP4) |
| 4 | −78.7392 | (D4) | | | |
| 5 | 0.0000 | 0.00 | (aperture stop) | | |
| 6 | 4.8410 | 1.60 | 1.76802 | 49.2 | |
| 7 | −6.5341 | 0.40 | 1.84666 | 23.8 | |
| 8 | −18.0569 | 0.10 | | | |
| 9 | 5.3990 | 1.00 | 1.60740 | 27.0 | (OKP4) |
| 10 | 2.6480 | (D10) | | | |
| 11 | 32.1069 | 1.55 | 1.53110 | 56.0 | (ZEONEX E48R) |
| 12 | −10.9293 | (D12) | | | |
| 13 | 0.0000 | 0.71 | 1.51680 | 64.1 | |
| 14 | 0.0000 | 0.90 | | | |

[Aspherical surface data]

Third surface

κ = 8.376, A4 = 1.4185E−05, A6 = −8.9566E−05, A8 = 2.5963E−06,
A10 = −4.9331E−07

Fourth surface

κ = 1.000, A4 = −6.7661E−04, A6 = −9.6376E−06, A8 = −1.1201E−05,
A10 = 4.5821E−07

Sixth surface

κ = 0.596, A4 = −8.2878E−04, A6 = 7.8992E−06, A8 = −4.2921E−06,
A10 = 1.0000E−15

Twelfth surface

κ = 1.000, A4 = 4.1828E−04, A6 = −6.7654E−06, A8 = 0.0000E+00,
A10 = 0.0000E+00

[Variable spacing data]

|  | Wide-angle end | Intermediate | Telephoto end |
|---|---|---|---|
| f | 4.066 | 8.138 | 16.287 |
| (D4) | 10.235 | 3.777 | 0.550 |
| (D10) | 4.634 | 9.057 | 17.907 |
| (D12) | 1.422 | 1.422 | 1.422 |
| Air conversion BF | 2.790 | 2.790 | 2.790 |
| Air conversion total length | 25.909 | 23.873 | 29.497 |

[Focal lengths of the respective groups]

|  | Group initial surface | Group focal length |
|---|---|---|
| First lens group | 1 | −8.65 |
| Second lens group | 6 | 7.55 |
| Third lens group | 11 | 15.53 |

[Values corresponding to conditional expressions]

Conditional expression (1) f1PL/(−f2PL) = 0.96
Conditional expression (2) (−f1)/f2 = 1.15
Conditional expression (3) f1PL/(−f1) = 1.73
Conditional expression (4) vd2 = 27.0
Conditional expression (5) (R22 + R21)/(R22 − R21) = 0.58
Conditional expression (6) −(R12 + R11)/(R12 − R11) = 0.88
Conditional expression (7) vd1 = 27.0

The various data given in Table 1 show that the present example satisfies all the adhesive conditional expressions (1) to (7).

Figure 2B:
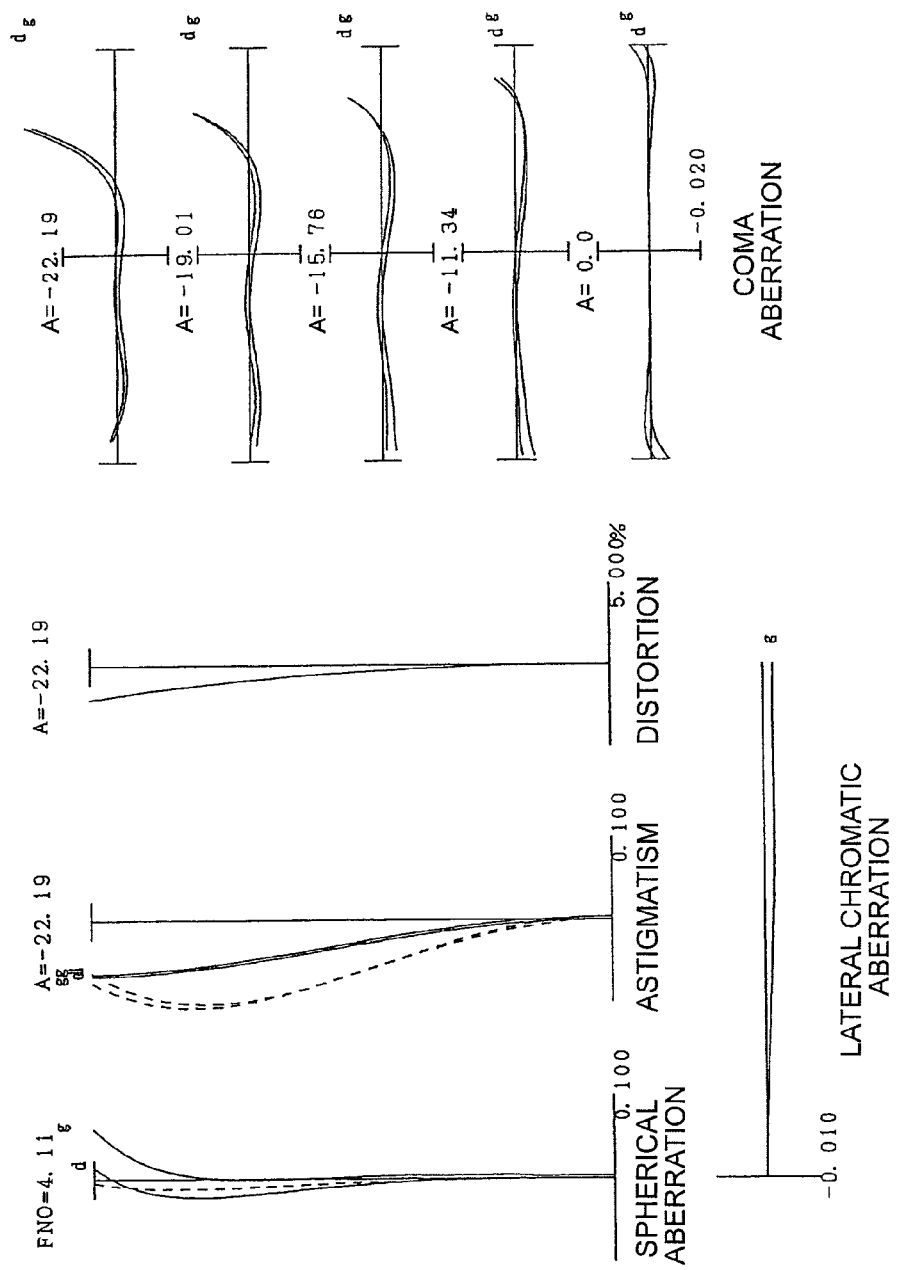
FIG. 2B is a set of aberration graphs with focus at infinity in an intermediate focal length state.
Figure 2C:
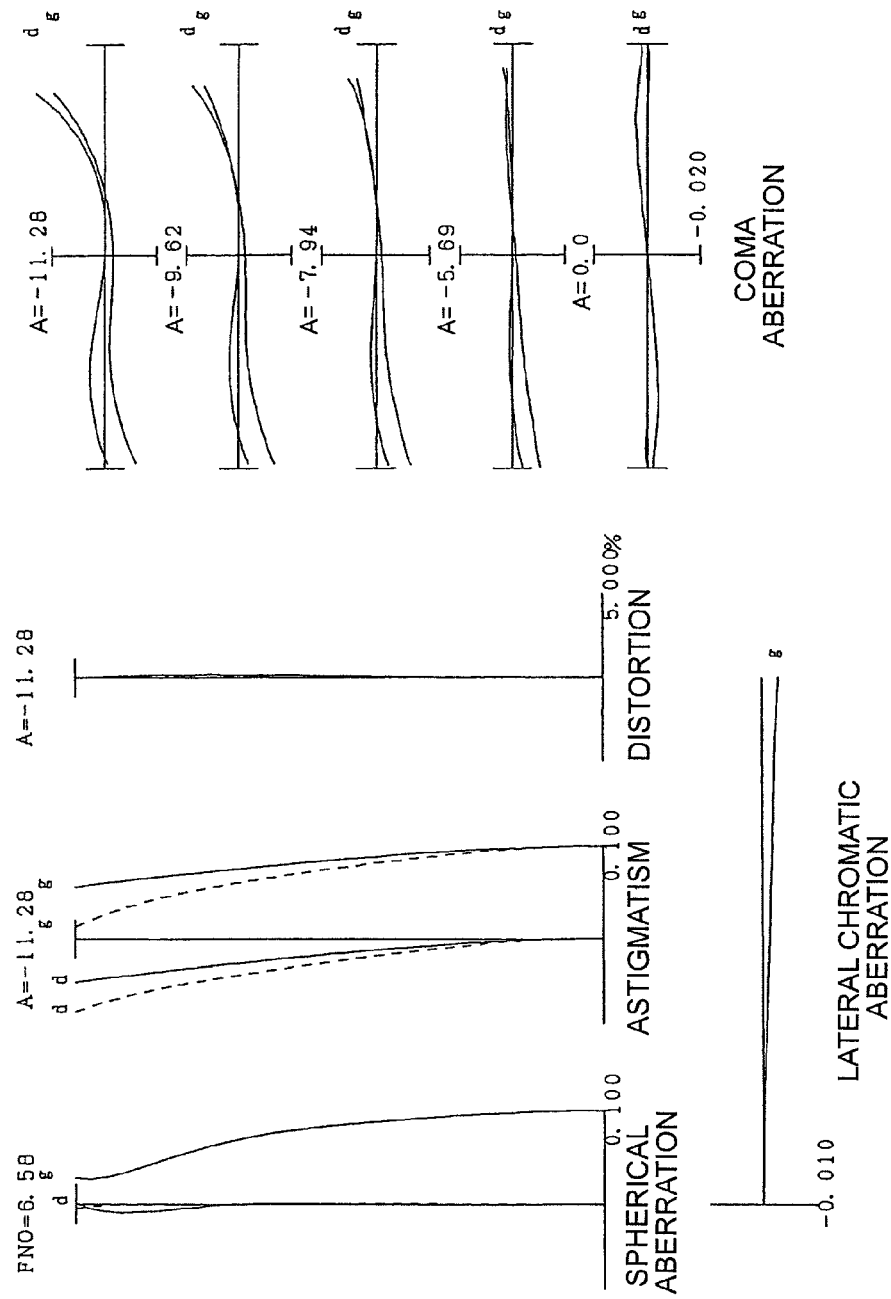
FIG. 2C is a set of aberration graphs with focus at infinity in a telephoto end state.

FIG. 2 is a set of aberration graphs (spherical aberration, astigmatism, distortion, lateral chromatic aberration and coma aberration) of Example 1, wherein FIG. 2A is a set of aberration graphs with focus at infinity in a wide-angle end state, FIG. 2B are various aberrations with focus at infinity in an intermediate focal length state, and FIG. 2C are various aberrations with focus at infinity in a telephoto end state. In each aberration graph, FNO denotes the F number, and A the angle of view. In the spherical aberration graphs, the solid line denotes spherical aberration and the broken line denotes a sine condition. In the astigmatism graphs, the solid line denotes a sagittal image surface, and the broken line denotes a meridional image surface. The coma aberration graphs illustrate meridional coma. The various aberrations are depicted for d, as the d-line (wavelength 587.6 nm) and g, as the g-line (wavelength 435.8 nm). Graphs without notation refer to the d-line. The explanation of the above aberration graphs applies to other examples, and a recurrent explanation will be omitted.

As the aberration graphs show, various aberrations, with the exception of distortion, are satisfactorily corrected, in Example 1, at each focal length state from the wide-angle end state to the telephoto end state. Negative distortion requires no optical correction, since at this aberration level, distortion can be sufficiently corrected by post-capture image processing.

Example 2

Figure 3:
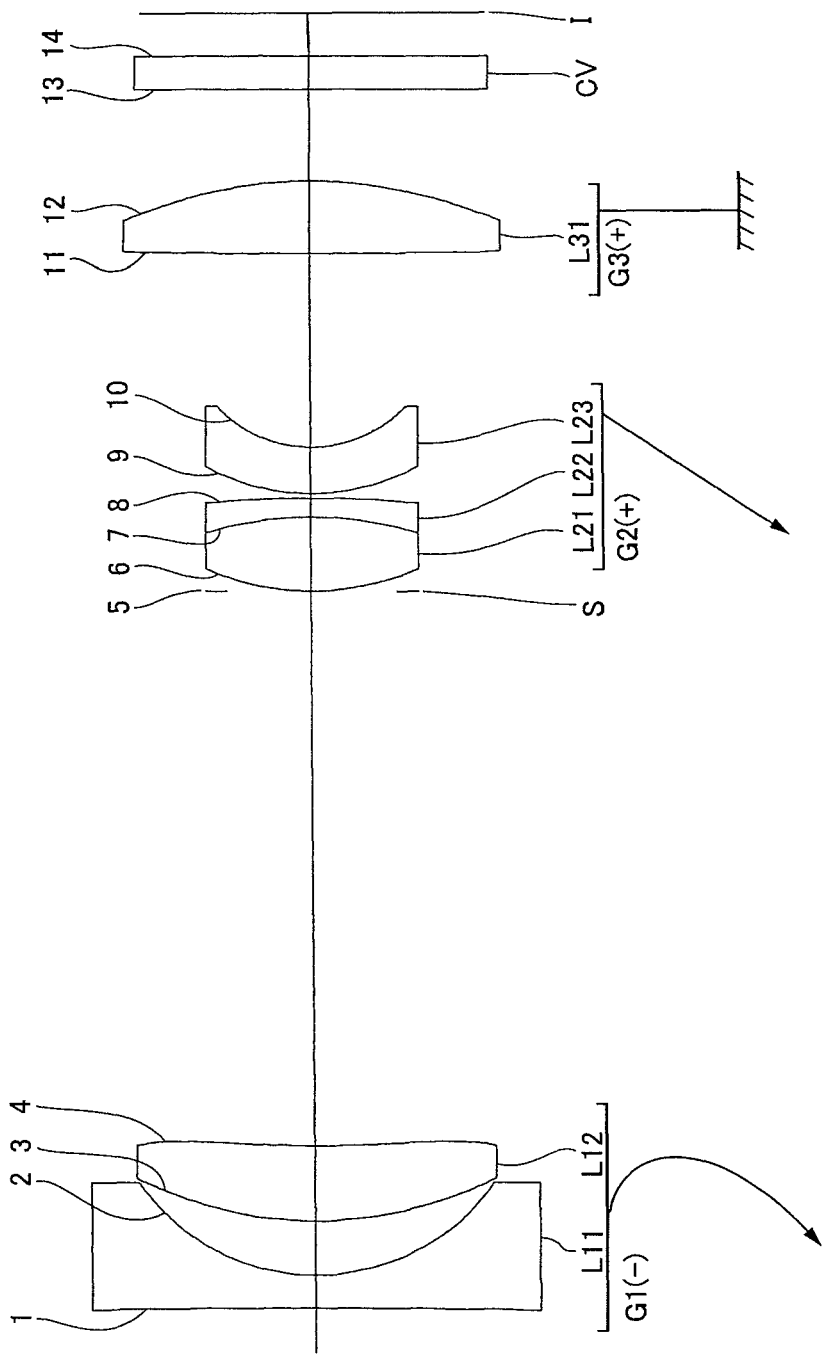
FIG. 3 is a diagram illustrating a lens schematic diagram and zoom locus in Example 2.

Example 2 will be explained based on FIG. 3, FIG. 4 and Table 2. FIG. 3 illustrates a lens schematic diagram and zoom locus in Example 2. As illustrated in FIG. 3, a zoom lens ZL (ZL2) according to Example 2 has, disposed in order from an object, a first lens group G1 having negative refractive power; a second lens group G2 having positive refractive power; and a third lens group G3 having positive refractive power.

The first lens group G1 comprises, disposed in order from an object, a biconcave spherical lens L11 and a plastic positive lens L12 having a positive meniscus shape with a convex surface facing the object.

The second lens group G2 comprises, disposed in order from an object, a cemented lens of a biconvex positive lens L21 and a negative meniscus lens L22 having a concave surface facing the object, and a plastic negative lens L23 having a negative meniscus shape with a convex surface facing the object.

The third lens group G3 comprises a biconvex plastic positive lens L31.

An aperture stop S for regulating the amount of light is arranged between the first lens group G1 and the second lens group G2. Between the third lens group G3 and the image surface I there is arranged a sensor cover glass CV of a solid imaging element, such as a CCD or the like, that is disposed on the image surface I.

Upon zooming from the wide-angle end state to the telephoto end state in the present example, the first lens group G1 and the second lens group G2 move while the third lens group G3 remains fixed. The aperture stop S moves together with the second lens group G2.

Various data on Example 2 are given in Table 2 below. The surface numbers 1 to 14 in Table 2 correspond to the surfaces 1 to 14 illustrated in FIG. 3. In Example 2, the third surface, fourth surface, sixth surface and twelfth surface have aspherical surface shapes.

TABLE 2

[General data]

|  | Wide-angle end | Intermediate | Telephoto end |
|---|---|---|---|
| f | 4.066 | 8.826 | 19.162 |
| Fno | 2.82 | 4.15 | 7.04 |
| ω | 40.02 | 20.51 | 9.63 |
| Image height | 2.900 | 3.250 | 3.250 |

[Lens data]

| Surface number | r | d | nd | νd | |
|---|---|---|---|---|---|
| 1 | −253.035 | 0.70 | 1.74100 | 52.7 | |
| 2 | 4.5615 | 1.15 | | | |
| 3 | 7.9749 | 1.60 | 1.63280 | 23.4 | (OKP4HT) |
| 4 | 23.3034 | (D4) | | | |
| 5 | 0.0000 | 0.00 | (aperture stop) | | |
| 6 | 5.2777 | 1.60 | 1.76802 | 49.2 | |
| 7 | −7.4133 | 0.40 | 1.84666 | 23.8 | |
| 8 | −23.8156 | 0.10 | | | |
| 9 | 4.5810 | 1.00 | 1.63280 | 23.4 | (OKP4HT) |
| 10 | 2.7041 | (D10) | | | |
| 11 | 173.8613 | 1.55 | 1.53110 | 56.0 | (ZEONEX E48R) |
| 12 | −8.7671 | (D12) | | | |
| 13 | 0.0000 | 0.71 | 1.51680 | 64.1 | |
| 14 | 0.0000 | 0.90 | | | |

[Aspherical surface data]

Third surface

κ = 0.674, A4 = −1.4800E−04, A6 = −2.6613E−05, A8 = 4.8951E−06, A10 = −2.1788E−07

Fourth surface

κ = 1.000, A4 = −1.0459E−03, A6 = −2.3503E−05, A8 = 3.2770E−06, A10 = −2.6985E−07

Sixth surface

κ = 0.369, A4 = −3.7263E−04, A6 = 1.5056E−05, A8 = −2.0033E−06, A10 = 0.0000E+00

Twelfth surface

κ = 1.000, A4 = 8.08393−04, A6 = −4.0950E−05, A8 = 1.2950E−06, A10 = 0.0000E+00

[Variable spacing data]

|  | Wide-angle end | Intermediate | Telephoto end |
|---|---|---|---|
| f | 4.066 | 8.826 | 19.162 |
| (D4) | 11.869 | 4.093 | 0.510 |
| (D10) | 4.132 | 9.136 | 20.000 |
| (D12) | 1.951 | 1.951 | 1.951 |
| Air conversion BF | 3.319 | 3.319 | 3.319 |
| Air conversion total length | 27.421 | 24.648 | 31.929 |

[Focal lengths of the respective groups]

|  | Group initial surface | Group focal length |
|---|---|---|
| First lens group | 1 | −9.50 |
| Second lens group | 6 | 7.85 |
| Third lens group | 11 | 15.75 |

[Values corresponding to conditional expressions]

Conditional expression (1) f1PL/(−f2PL) = 1.17
Conditional expression (2) (−f1)/f2 = 1.21
Conditional expression (3) f1PL/(−f1) = 1.94
Conditional expression (4) νd2 = 23.4
Conditional expression (5) (R22 + R21)/(R22 − R21) = 0.64
Conditional expression (6) −(R12 + R11)/(R12 − R11) = 0.96
Conditional expression (7) νd1 = 23.4

The various data given in Table 2 show that the present example satisfies all the adhesive conditional expressions (1) to (7).

Figure 4A:
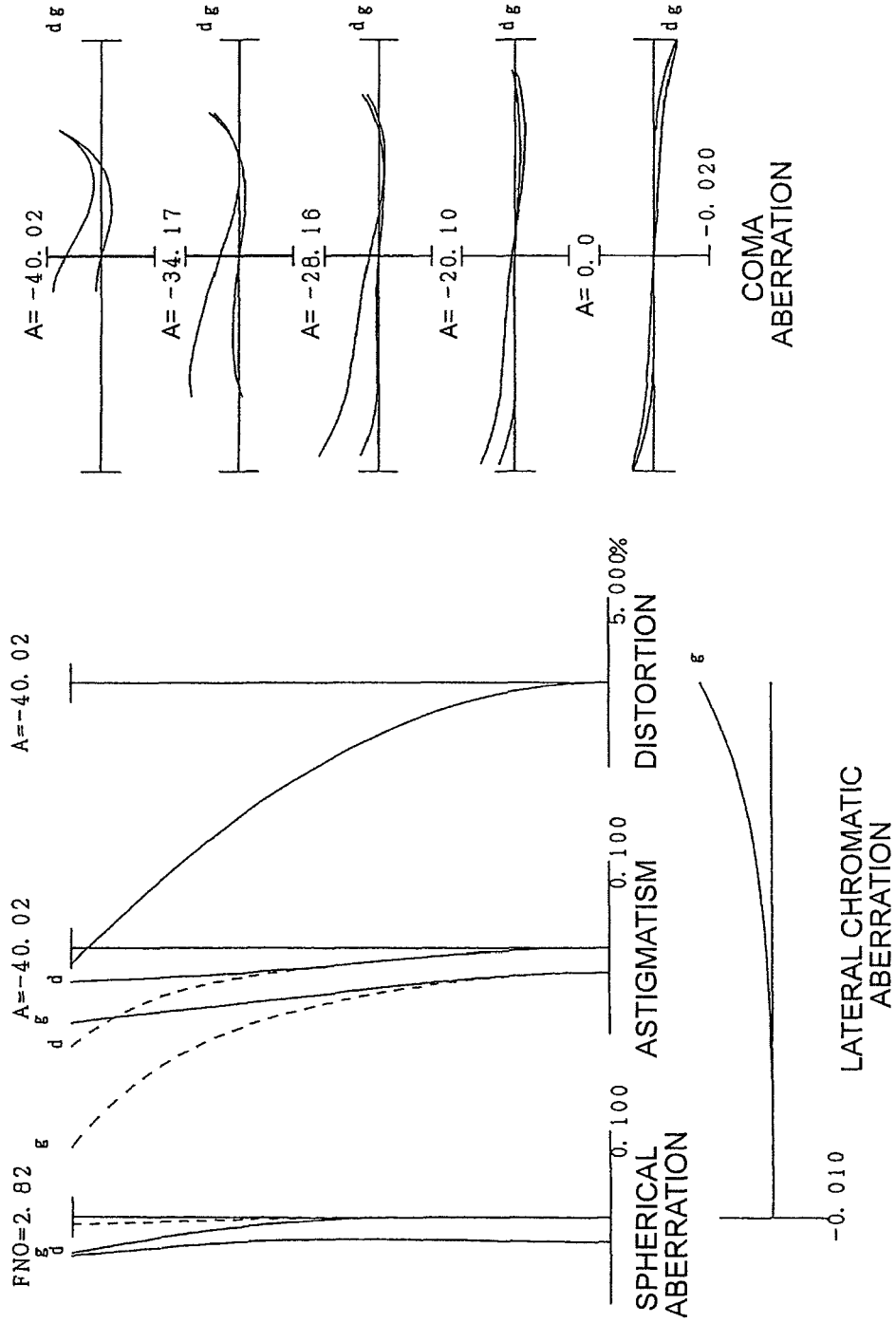
FIG. 4A is a set of aberration graphs with focus at infinity in a wide-angle end state.
Figure 4C:
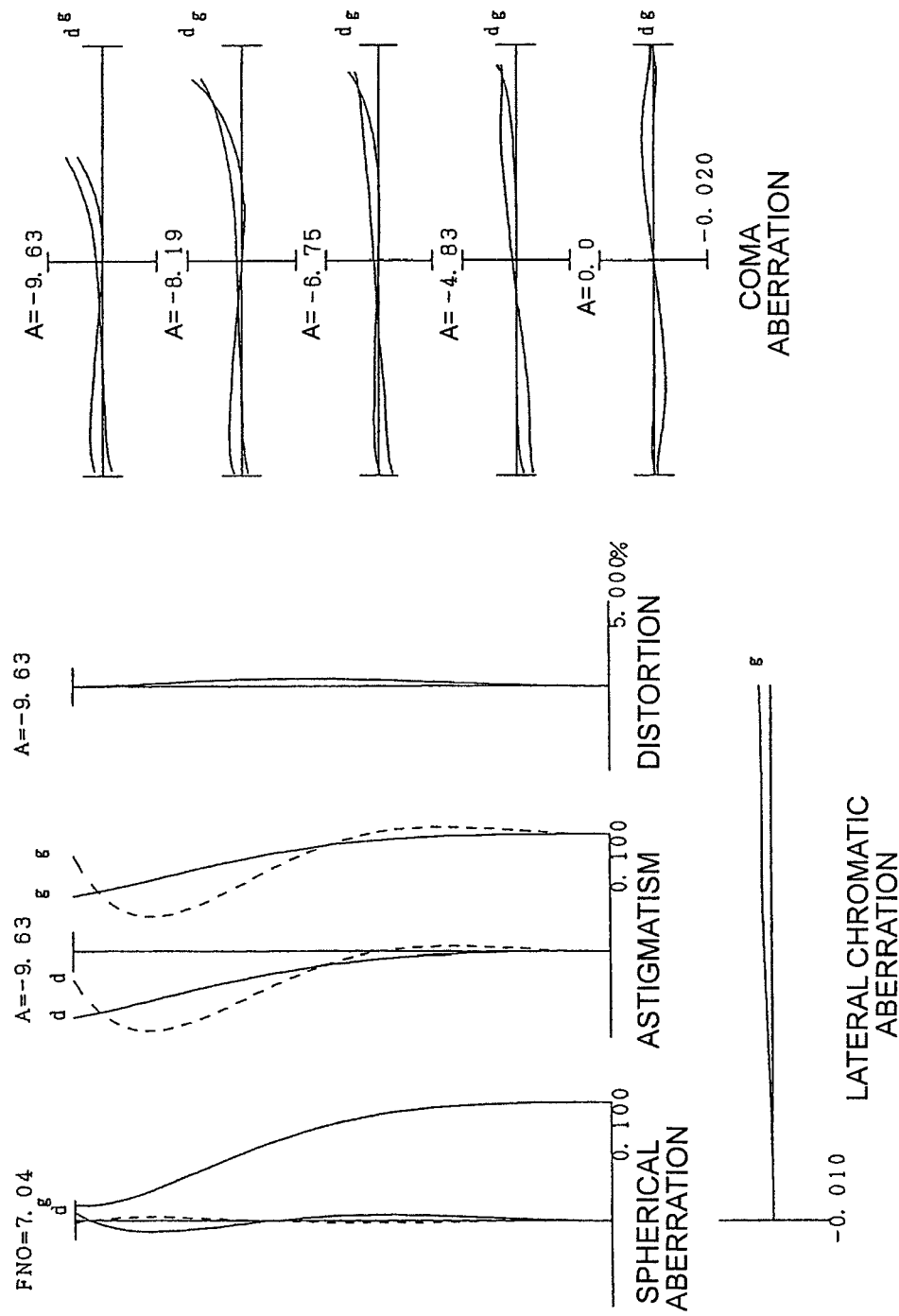
FIG. 4C is a set of aberration graphs with focus at infinity in a telephoto end state.

FIG. 4 is a set of aberration graphs (spherical Aberration, astigmatism, distortion, lateral chromatic aberration and coma aberration) of Example 2, wherein FIG. 4A is a set of Aberration graphs with focus at infinity in a wide-angle end state, FIG. 4B are various aberrations with focus at infinity in an intermediate focal length state, and FIG. 4C are various Aberrations with focus at infinity in a telephoto end state. As the aberration graphs show, various aberrations, with the exception of distortion, are satisfactorily corrected, in Example 2, at each focal length state from the wide-angle end state to the telephoto end state. Negative distortion requires no optical correction, since at this aberration level, distortion can be sufficiently corrected by post-capture image processing.

Example 3

Example 3 will be explained based on FIG. 5, FIG. 6 and Table 3. FIG. 5 illustrates a lens schematic diagram and zoom locus in Example 3. As illustrated in FIG. 5, a zoom lens ZL (ZL3) according to Example 3 has, disposed in order from an object, a first lens group G1 having negative refractive power; a second lens group G2 having positive refractive power; and a third lens group G3 having positive refractive power.

The first lens group G1 comprises, disposed in order from an object, a biconcave spherical lens L11 and a biconvex plastic positive lens L12.

The second lens group G2 comprises, disposed in order from an object, a biconvex positive lens L21 and a negative meniscus plastic lens L22 having a concave surface facing the object, a plastic negative lens L22 having a negative meniscus shape with a convex surface facing the object, and a positive meniscus lens L 23 having a concave surface facing the object.

The third lens group G3 comprises a biconvex plastic positive lens L31.

An aperture stop S for regulating the amount of light is arranged between the plastic negative lens L22 having a negative meniscus shape with a convex surface facing the object and the positive meniscus lens L 23 having a concave surface facing the object which constitute the second lens group G2. Between the third lens group G3 and the image surface I there is arranged a sensor cover glass CV of a solid imaging element, such as a CCD or the like, that is disposed on the image surface I.

Upon zooming from the wide-angle end state to the telephoto end state in the present example, all the lens groups form the first lens group G1 to the third lens group G3 move. The aperture stop S moves together with the second lens group G2.

Various data on Example 3 are given in Table 3 below. The surface numbers 1 to 15 in Table 3 correspond to the surfaces 1 to 15 illustrated in FIG. 5. In Example 3, the third surface, fourth surface, fifth surface, sixth surface and thirteenth surface have aspherical surface shapes.

TABLE 3

[General data]

|  | Wide-angle end | Intermediate | Telephoto end |
|---|---|---|---|
| f | 4.066 | 8.300 | 17.500 |
| Fno | 2.79 | 4.13 | 7.08 |

TABLE 3-continued

| | | | | |
|---|---|---|---|---|
| ω | 39.64 | 22.04 | 10.52 | |
| Image height | 2.850 | 3.250 | 3.250 | |

[Lens data]

| Surface number | r | d | nd | vd | |
|---|---|---|---|---|---|
| 1 | −43.2545 | 0.70 | 1.75500 | 52.3 | |
| 2 | 4.325 | 1.25 | | | |
| 3 | 15.0684 | 1.75 | 1.60700 | 27.0 | (OKP4) |
| 4 | −27.9154 | (D4) | | | |
| 5 | 4.0618 | 1.55 | 1.59201 | 67.1 | |
| 6 | −17.7481 | 0.00 | | | |
| 7 | 0.0000 | 0.10 | (aperture stop) | | |
| 8 | 5.5891 | 0.80 | 1.63200 | 23.0 | (OKP4HT) |
| 9 | 2.7855 | 0.40 | | | |
| 10 | 4.5259 | 1.00 | 1.60311 | 65.4 | |
| 11 | 4.5779 | (D11) | | | |
| 12 | 14.0251 | 1.55 | 1.59201 | 67.1 | |
| 13 | −34.1713 | (D13) | | | |
| 14 | 0.0000 | 1.00 | 1.51680 | 63.9 | |
| 15 | 0.0000 | 0.71 | | | |

[Aspherical surface data]

Third surface

κ = 1.000, A4 = 1.0610E−03, A6 = −2.0028E−04, A8 = 2.7995E−05, A10 = −1.3397E−06
Fourth surface κ = 1.000, A4 = −4.5663E−04, A6 = −1.3284E−04, A8 = 1.6381E−05, A10 = −1.0493E−06
Fifth surface κ = 0.245, A4 = −5.0707E−05, A6 = 2.0572E−05, A8 = 0.0000E+00, A10 = 0.0000E+00
Sixth surface κ = 1.000, A4 = 6.0000E−04, A6 = 0.0000E+00, A8 = 0.0000E+00, A10 = 0.0000E+00
Thirteenth surface

κ = 1.000, A4 = 2.0363E−04, A6 = −3.2867E−05, A8 = 1.3298E−06, A10 = 0.0000E+00

[Variable spacing data]

| | Wide-angle end | Intermediate | Telephoto end |
|---|---|---|---|
| f | 4.066 | 8.300 | 17.500 |
| (D4) | 10.884 | 4.102 | 0.677 |
| (D11) | 3.652 | 8.659 | 19.286 |
| (D13) | 1.851 | 1.753 | 1.545 |
| Air conversion BF | 3.219 | 3.121 | 2.913 |
| Air conversion total length | 26.855 | 24.983 | 31.977 |

[Focal lengths of the respective groups]

| | Group initial surface | Group focal length |
|---|---|---|
| First lens group | 1 | −8.90 |
| Second lens group | 5 | 7.95 |
| Third lens group | 12 | 17.00 |

[Values corresponding to conditional expressions]

Conditional expression (1) f1PL/(−f2PL) = 1.66
Conditional expression (2) (−f1)/f2 = 1.12
Conditional expression (3) f1PL/(−f1) = 1.84
Conditional expression (4) vd2 = 23.4
Conditional expression (5) (R22 + R21)/(R22 − R21) = 0.63
Conditional expression (6) −(R12 + R11)/(R12 − R11) = 0.82
Conditional expression (7) vd1 = 27.0

The various data given in Table 3 show that the present example satisfies all the adhesive conditional expressions (1) to (7)

Figure 6A:
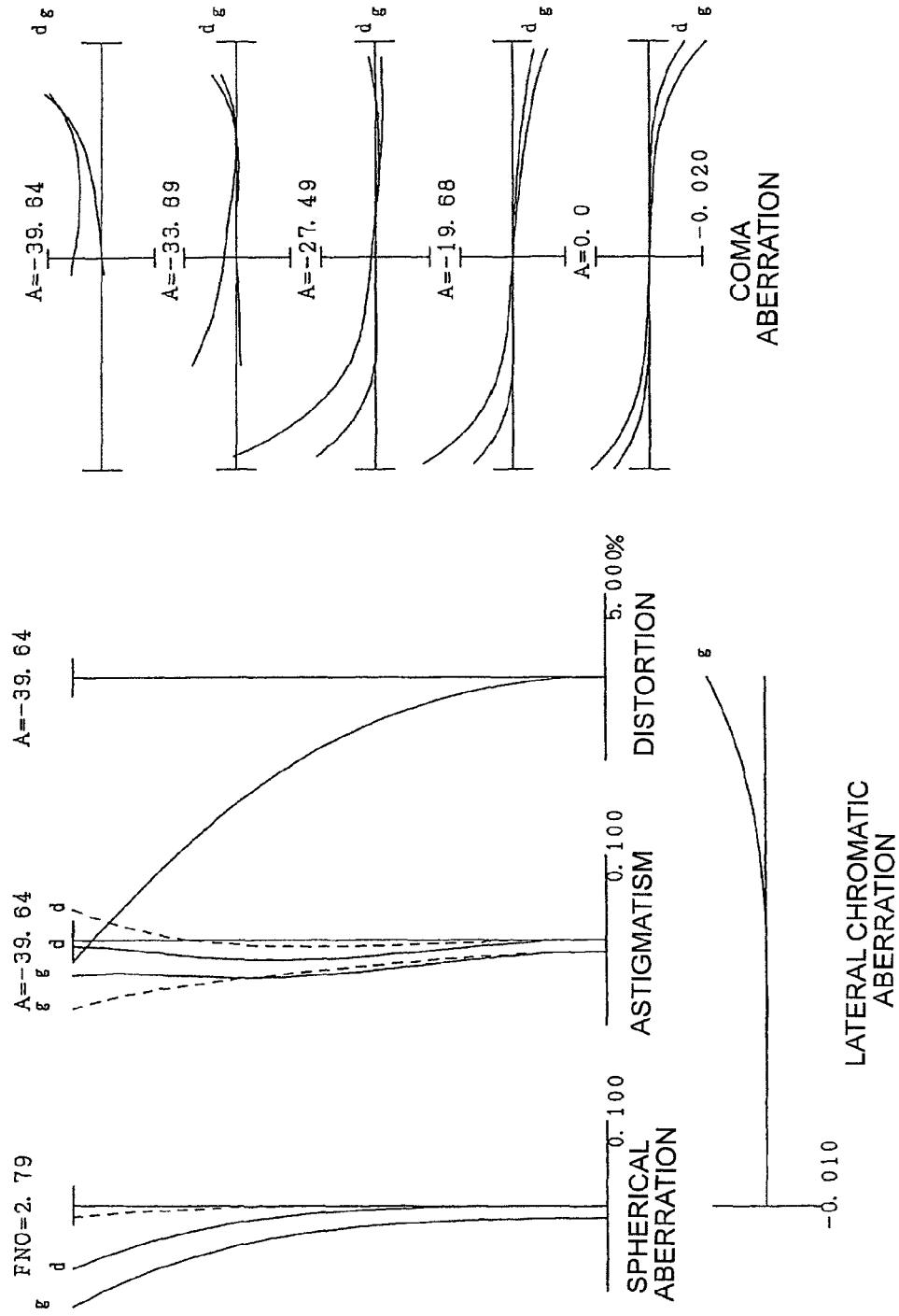
FIG. 6A is a set of aberration graphs with focus at infinity in a wide-angle end state.
Figure 6B:
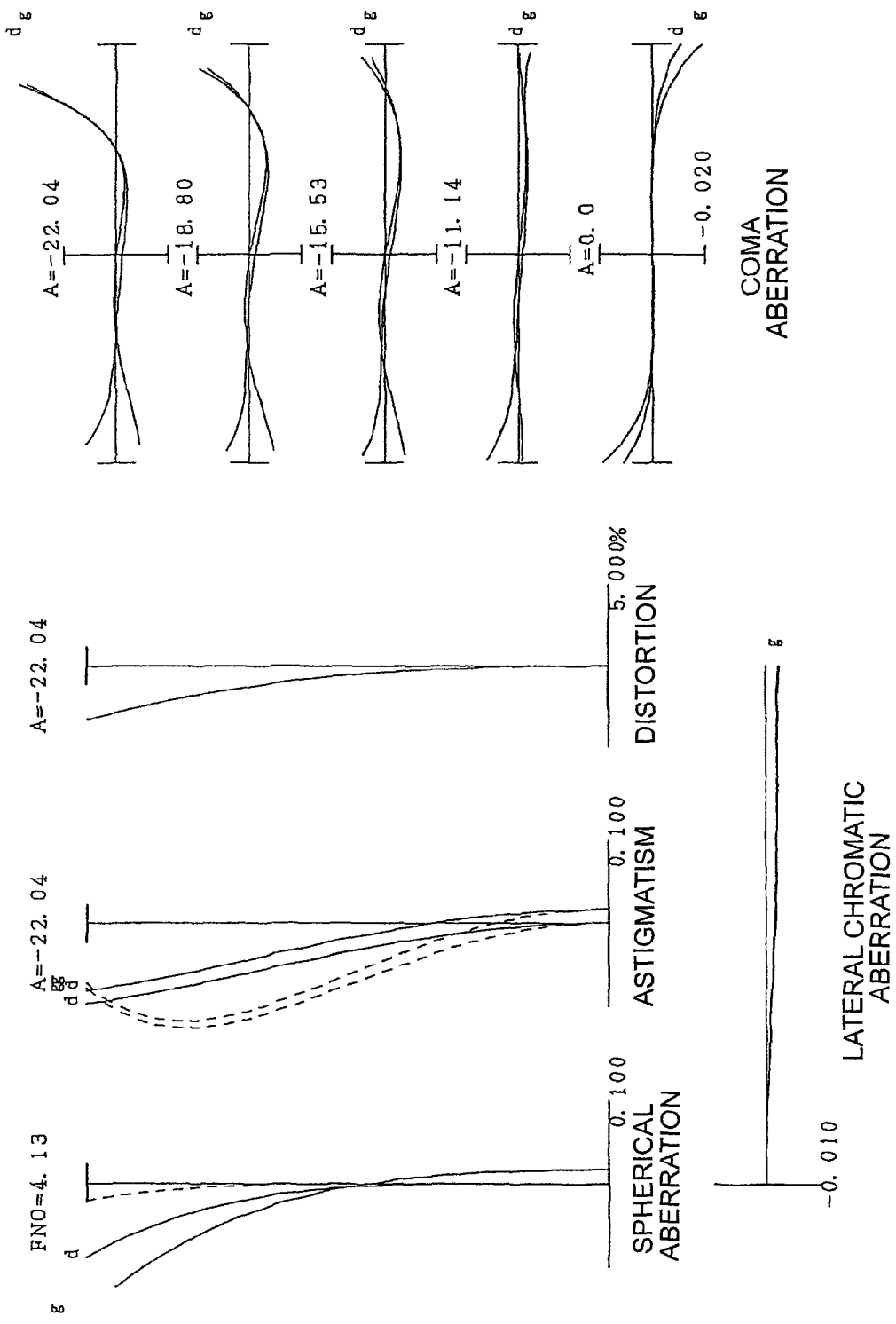
FIG. 6B is a set of aberration graphs with focus at infinity in an intermediate focal length state.
Figure 6C:
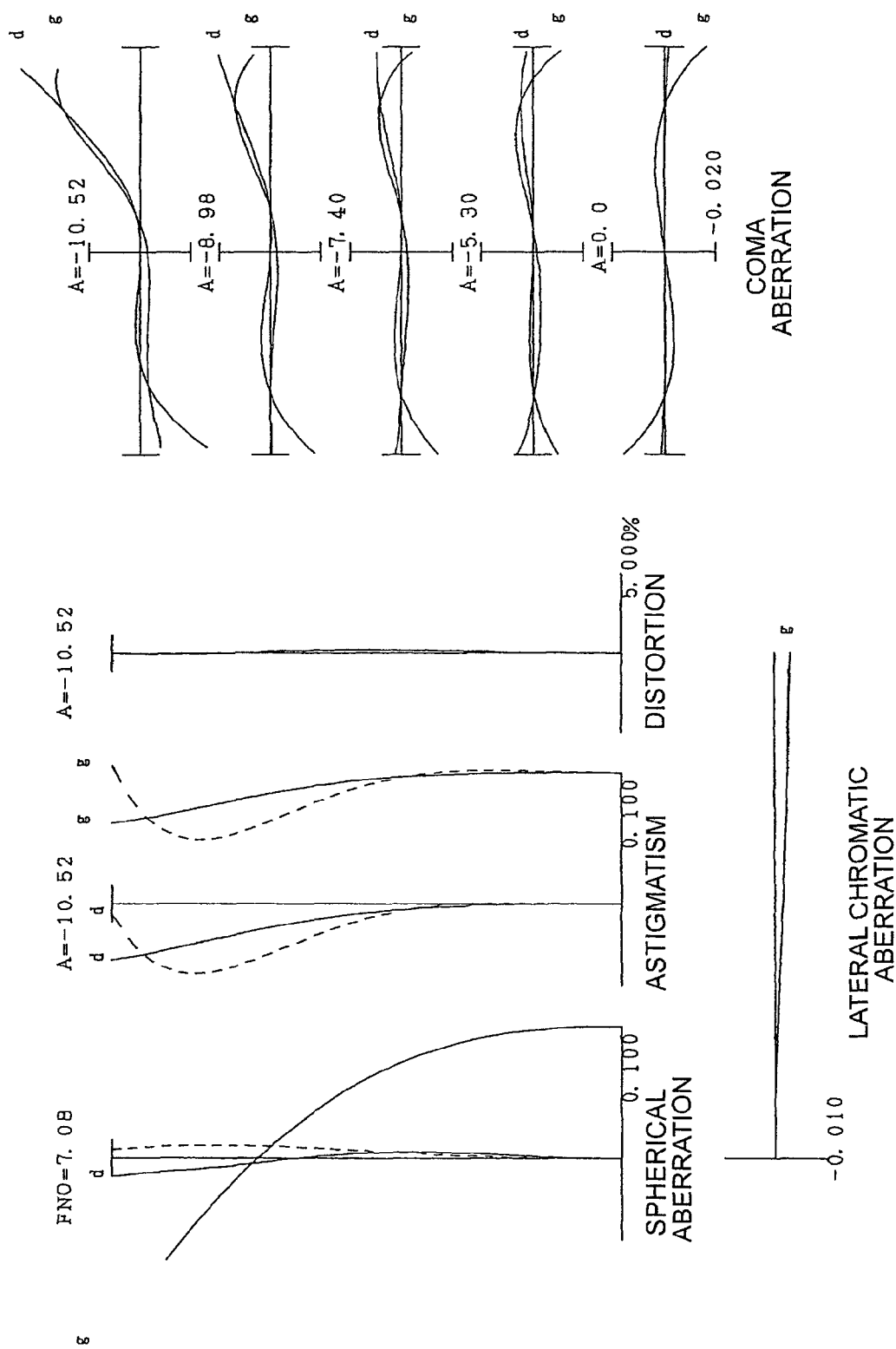
FIG. 6C is a set of aberration graphs with focus at infinity in a telephoto end state.

FIG. 6 is a set of aberration graphs (spherical aberration, astigmatism, distortion, lateral chromatic aberration and coma aberration) of Example 3, wherein FIG. 6A is a set of aberration graphs with focus at infinity in a wide-angle end state, FIG. 6B are various aberrations with focus at infinity in an intermediate focal length state, and FIG. 6C are various aberrations with focus at infinity in a telephoto end state. As the aberration graphs show, various aberrations, with the exception of distortion, are satisfactorily corrected, in Example 3, at each focal length state from the wide-angle end state to the telephoto end state. Negative distortion requires no optical correction, since at this aberration level, distortion can be sufficiently corrected by post-capture image processing.

Example 4

Example 4 will be explained based on FIG. 7, FIG. 8 and Table 4. FIG. 7 illustrates a lens schematic diagram and zoom locus in Example 4. As illustrated in FIG. 7, a zoom lens ZL (ZL4) according to Example 4 has, disposed in order from an object, a first lens group G1 having negative refractive power; a second lens group G2 having positive refractive power; and a third lens group G3 having positive refractive power.

The first lens group G1 comprises, disposed in order from an object, a biconcave spherical lens L11 and a biconvex plastic positive lens L12.

The second lens group G2 comprises, disposed in order from an object, a cemented lens of a biconvex positive lens L21 and a negative meniscus lens L22 having a concave surface facing the object, and a plastic negative lens L22 having a negative meniscus shape with a convex surface facing the object.

The third lens group G3 comprises a biconvex plastic positive lens L31.

An aperture stop S for regulating the amount of light is arranged between the first lens group G1 and the second lens group G2. Between the third lens group G3 and the image surface I there is arranged a sensor cover glass CV of a solid imaging element, such as a CCD or the like, that is disposed on the image surface I.

Upon zooming from the wide-angle end state to the telephoto end state in the present example, all the lens groups form the first lens group G1 to the third lens group G3 move. The aperture stop S moves together with the second lens group G2.

Various data on Example 4 are given in Table 4 below. The surface numbers 1 to 13 in Table 4 correspond to the surfaces 1 to 13 illustrated in FIG. 7. In Example 4, the fourth surface, sixth surface, seventh surface, ninth surface and eleventh surface have aspherical surface shapes.

TABLE 4

[General data]

| | Wide-angle end | Intermediate | Telephoto end |
|---|---|---|---|
| f | 4.066 | 8.172 | 16.424 |
| Fno | 3.04 | 4.33 | 6.91 |
| ω | 40.01 | 22.17 | 11.19 |
| Image height | 2.900 | 3.250 | 3.250 |

TABLE 4-continued

[Lens data]

| Surface number | r | d | nd | vd | |
|---|---|---|---|---|---|
| 1 | −50.0000 | 0.70 | 1.74100 | 52.7 | |
| 2 | 4.4218 | 1.35 | | | |
| 3 | 12.9385 | 1.60 | 1.63200 | 23.0 | (OKP4HT) |
| 4 | −89.3093 | (D4) | | | |
| 5 | 0.0000 | 0.00 | (aperture stop) | | |
| 6 | 3.8098 | 1.60 | 1.59252 | 67.9 | |
| 7 | −10.9002 | 0.10 | | | |
| 8 | 9.2735 | 1.20 | 1.63200 | 23.0 | (OKP4HT) |
| 9 | 3.1427 | (D9) | | | |
| 10 | −109.3290 | 1.55 | 1.53110 | 56.0 | (ZEONEX E48R) |
| 11 | −8.8801 | (D11) | | | |
| 12 | 0.0000 | 0.80 | 1.51680 | 63.9 | |
| 13 | 0.0000 | 0.84 | | | |

[Aspherical surface data]

Fourth surface $\kappa = 1.000, A4 = -1.0878E-03, A6 = 1.1513E-05, A8 = -4.1891E-06, A10 = 5.2157E-08$ Sixth surface $\kappa = 1.344, A4 = -2.6647E-03, A6 = -1.0021E-04, A8 = -1.6362E-05, A10 = 1.0000E-15$ Seventh surface $\kappa = -9.000, A4 = 0.0000E+00, A6 = 0.0000E+00, A8 = 0.0000E+00, A10 = 0.0000E+00$ Ninth surface $\kappa = 1.506, A4 = 0.0000E+00, A6 = 0.0000E+00, A8 = 0.0000E+00, A10 = 0.0000E+00$ Eleventh surface $\kappa = 1.000, A4 = 4.3501E-04, A6 = -5.2703E-06, A8 = 0.0000E+00, A10 = 0.0000E+00$

[Variable spacing data]

| | Wide-angle end | Intermediate | Telephoto end |
|---|---|---|---|
| f | 4.066 | 8.172 | 16.424 |
| (D4) | 10.427 | 3.733 | 0.402 |
| (D9) | 3.343 | 7.784 | 16.859 |
| (D11) | 2.589 | 2.667 | 2.826 |
| Air conversion BF | 3.957 | 4.035 | 4.194 |
| Air conversion total length | 25.826 | 23.652 | 29.556 |

[Focal lengths of the respective groups]

| | Group initial surface | Group focal length |
|---|---|---|
| First lens group | 1 | −8.90 |
| Second lens group | 6 | 7.70 |
| Third lens group | 10 | 18.09 |

[Values corresponding to conditional expressions]

Conditional expression (1) f1PL/(−f2PL) = 2.19
Conditional expression (2) (−f1)/f2 = 1.16
Conditional expression (3) f1PL/(−f1) = 2.02
Conditional expression (4) vd2 = 23.4
Conditional expression (5) (R22 + R21)/(R22 − R21) = 0.48
Conditional expression (6) −(R12 + R11)/(R12 − R11) = 0.84
Conditional expression (7) vd1 = 23.4

The various data given in Table 4 show that the present example satisfies all the adhesive conditional expressions (1) to (7).

Figure 8A:
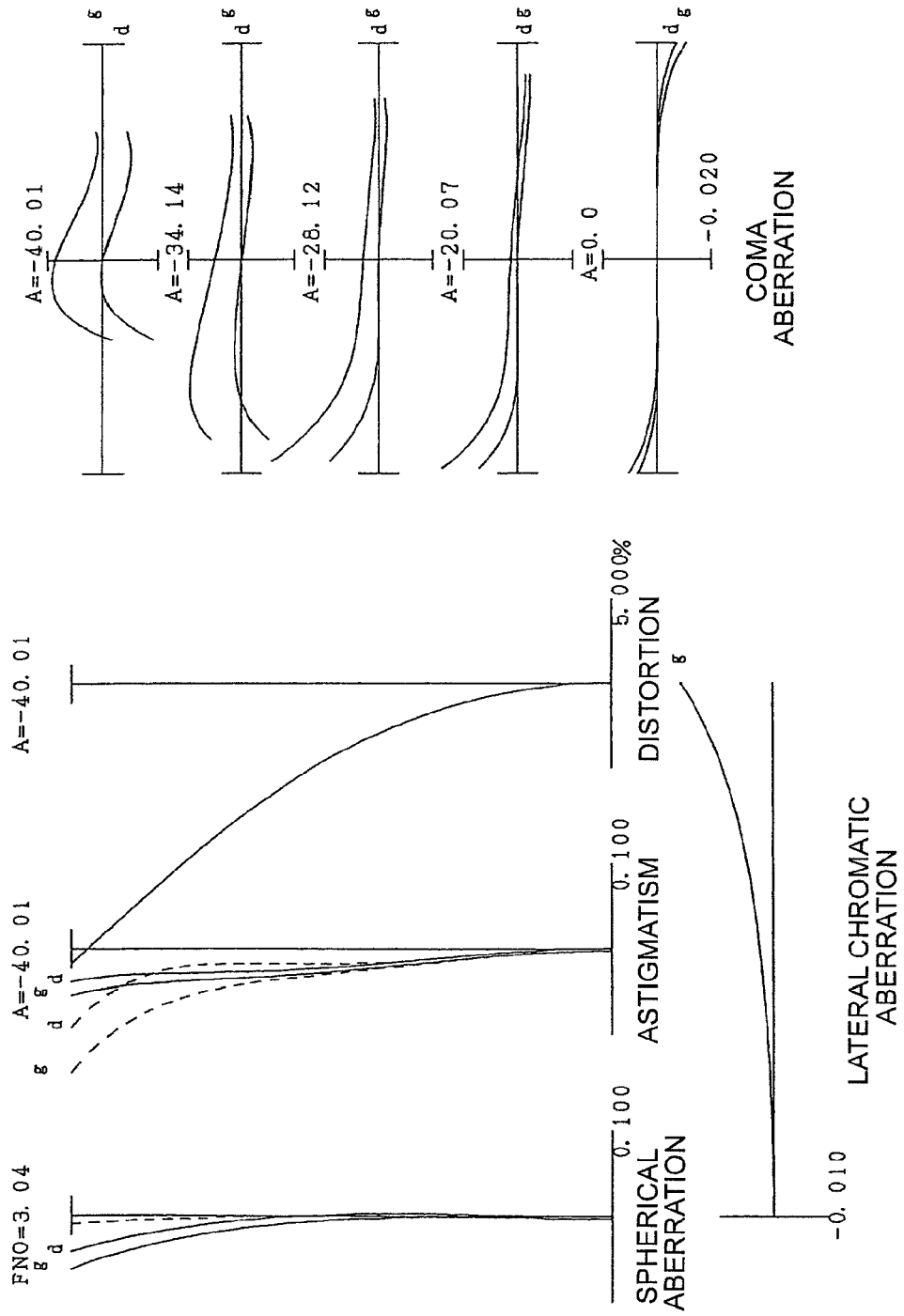
FIG. 8A is a set of aberration graphs with focus at infinity in a wide-angle end state.
Figure 8B:
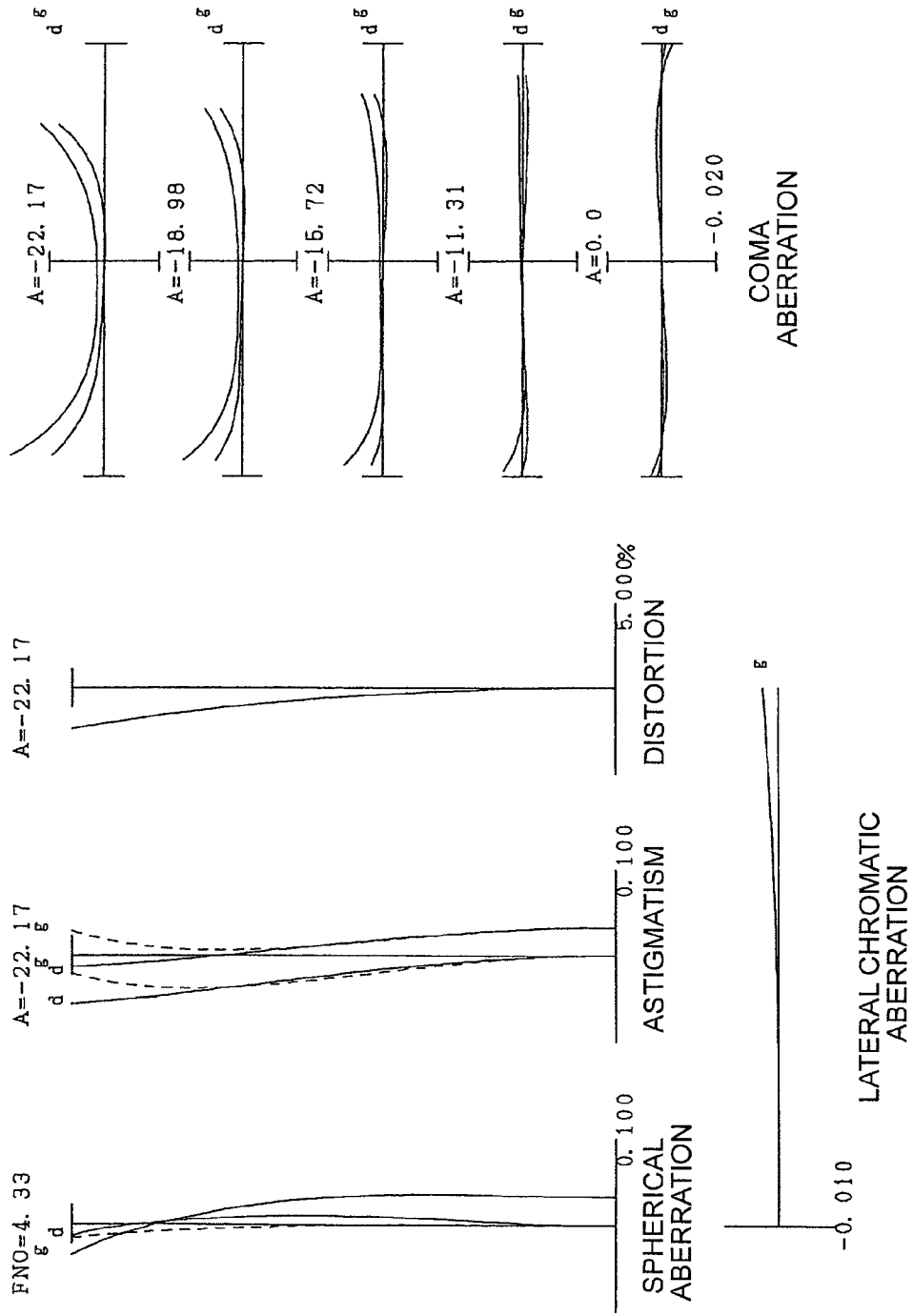
FIG. 8B is a set of aberration graphs with focus at infinity in an intermediate focal length state.
Figure 8C:
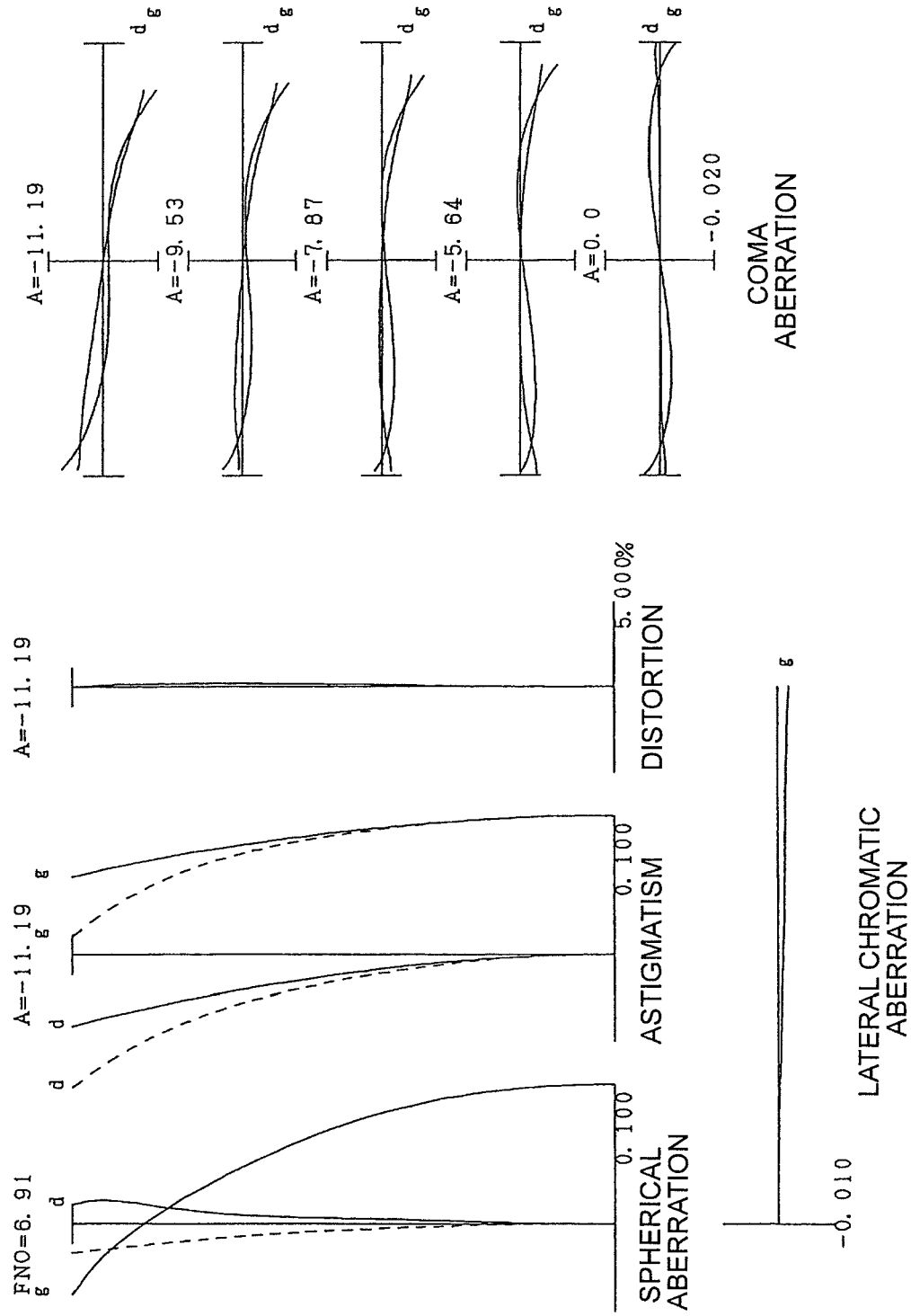
FIG. 8C is a set of aberration graphs with focus at infinity in a telephoto end state.

FIG. 8 is a set of aberration graphs (spherical aberration, astigmatism, distortion, lateral chromatic aberration and coma aberration) of Example 4, wherein FIG. 8A is a set of aberration graphs with focus at infinity in a wide-angle end state, FIG. 8B are various aberrations with focus at infinity in an intermediate focal length state, and FIG. 8C are various aberrations with focus at infinity in a telephoto end state. As the aberration graphs show, various aberrations, with the exception of distortion, are satisfactorily corrected, in Example 4, at each focal length state from the wide-angle end state to the telephoto end state. Negative distortion requires no optical correction, since at this aberration level, distortion can be sufficiently corrected by post-capture image processing.

In the above embodiments, the below-described features can be adopted so long as the optical performance is not impaired as a result.

Three-group configurations have been described, but the other group configurations are possible, for instance configurations of four groups, five groups and the like. Also, a lens or a lens group may be added to the side closest to the object, or a lens or a lens group may be added to the side closest to the image. A lens group refers herein to a portion having at least one lens isolated by an air gap that changes upon zooming.

In the present embodiment, a single lens group or a plurality of lens groups or a partial lens group may constitute a focusing lens group that performs focusing from an object at infinity to an object at close distance, through displacement in the optical axis direction. This focusing lens group can be used for auto focus, and is also suitable for a driving motor for auto focusing (driving using an ultrasonic motor or the like). Preferably, in particular, the third lens group is a focusing lens group.

In the present embodiment, a lens group or a partial lens group may be a vibration-isolating lens group, which corrects image blur generated by shaking, through oscillation of the lens group or the partial lens group in a direction perpendicular to the optical axis, or through rotation (swinging) of the lens group or the partial lens group in an in-plane direction that encompasses the optical axis. Preferably, in particular, at least part of the second lens group is a vibration-isolating lens group.

In the present embodiment, the lens surface may be formed as a spherical surface, a planar surface or an aspherical surface. Spherical and planar lens surfaces are preferable in that processing of the lenses and adjustment of the lens assembly is easy, in terms of preventing impairment of optical performance due to processing and/or assembly errors. Spherical and planar lens surfaces are also preferable in that depictive performance is less impaired even upon shifting of the image surface. In a case where the lens surface is an aspherical surface, the aspherical surface may be made by grinding, or may be a glass-mold aspherical surface made by molding glass into an aspherical surface shape, or a composite aspherical surface made by forming an aspherical surface shape of resin on a surface of glass. The lens surfaces may also be diffractive surfaces. The lenses may be gradient-index lenses (GRIN lenses) or plastic lenses.

In the present embodiment, the aperture stop is preferably arranged in or near the second lens group, but a lens frame may function as the aperture stop, without any member being provided as an aperture stop.

In the present embodiment, each lens surface may be coated with an antireflection film having high transmittance in a wide wavelength region, to reduce flares and ghosts, and achieve thereby high optical performance with high contrast.

The zoom lens (variable magnification optical system) of the present embodiment has a zoom ratio ranging from about 2 to 7.

In the zoom lens (variable magnification optical system) of the present embodiment, preferably, the first lens group has one positive lens component and one negative lens component. Preferably, the lens components are disposed, in order from the object, to be in the sequence negative-positive, with an air gap in between.

In the zoom lens (variable magnification optical system) of the present embodiment, preferably, the second lens group has one positive lens component and one negative lens component. Preferably, the lens components are disposed, in order from the object, to be in the sequence positive-negative, with an air gap in between.

In the zoom lens (variable magnification optical system) of the present embodiment, preferably, the third lens group has one positive lens component.

For the sake easier comprehension, the present invention has been described based on constituent features of embodiments, but needless to say the present invention is not limited to such features in any way.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A zoom lens, comprising:
   in order from an object, a first lens group having negative refractive power; a second lens group having positive refractive power; and a third lens group having positive refractive power, wherein
   the first lens group comprises only one negative spherical lens and one plastic positive lens separated by an air gap;
   the second lens group comprises three or fewer lenses, including one positive lens component and one plastic negative lens; and
   the condition of the following expressions are satisfied:

$0.50 < f1PL/(-f2PL) < 2.50$ $0.80 < (-f1)/f2 < 1.35$ where f1PL is a focal length of the plastic positive lens forming the first lens group, f2PL is the focal length of the plastic negative lens forming the second lens group, f1 is the focal length of the first lens group, and f2 is the focal length of the second lens group.

2. The zoom lens according to claim 1, wherein the condition of the following expression is satisfied:

$1.00 < f1PL/(-f1) < 3.00$.

3. The zoom lens according to claim 1, wherein the condition of the following expression is satisfied:

$15.0 < vd2 < 35.0$ where vd2 is the Abbe number of the plastic negative lens forming the second lens group.

4. The zoom lens according to claim 1, wherein the positive lens forming the second lens group satisfies the condition of the following expression:

$0.30 < (R22+R21)/(R22-R21) < 1.20$ where R21 is the radius of curvature of a lens surface facing the object, and R22 is the radius of curvature of a lens surface facing the image.

5. The zoom lens according to claim 1, wherein the plastic negative lens forming the second lens group is a spherical lens.

6. The zoom lens according to claim 1, wherein the negative spherical lens forming the first lens group satisfies the following expression:

$0.65 < -(R12+R11)/(R12-R11) < 1.50$ where R11 is the radius of curvature of a lens surface facing the object and R12 is the radius of curvature of a lens surface facing the image.

7. The zoom lens according to claim 1, wherein the condition of the following expression is satisfied:

$15.0 < vd1 < 35.0$ where vd1 is the Abbe number of the plastic positive lens forming the first lens group.

8. The zoom lens according to claim 1, wherein the third lens group comprises one lens.

9. The zoom lens according to claim 1, wherein the third lens group comprises a plastic lens.

10. The zoom lens according to claim 1, wherein an aperture stop is arranged farther on the image side than the first lens group.

11. The zoom lens according to claim 1, wherein the aperture stop moves together with the second lens group, upon zooming from a wide-angle end state to a telephoto end state.

12. An optical apparatus, comprising the zoom lens according to claim 1.

13. A zoom lens manufacturing method for manufacturing the zoom lens according to claim 1.

14. The zoom lens manufacturing method according to claim 13, wherein the condition of the following expression is satisfied:

$1.00 < f1PL/(-f1) < 3.00$.

15. The zoom lens manufacturing method according to claim 13, wherein the condition of the following expression is satisfied:

$15.0 < vd2 < 35.0$ where vd2 is the Abbe number of the plastic negative lens forming the second lens group.

16. The zoom lens manufacturing method according to claim 13, wherein the positive lens component forming the second lens group satisfies the condition of the following expression:

$0.30 < (R22+R21)/(R22-R21) < 1.20$ where R21 is the radius of curvature of a lens surface facing an object, and R22 is the radius of curvature of a lens surface facing an image.

17. The zoom lens manufacturing method according to claim 13, wherein the plastic negative lens forming the second lens group is a spherical lens.

18. The zoom lens manufacturing method according to claim 13, wherein the negative spherical lens forming the first lens group satisfies the following expression:

$0.65 < -(R12+R11)/(R12-R11) < 1.50$ where R11 is the radius of curvature of a lens surface n facing the object and R12 is the radius of curvature of a lens surface facing the image.

* * * * *